United States Patent
Shen et al.

(10) Patent No.: US 7,646,820 B2
(45) Date of Patent: Jan. 12, 2010

(54) TRANSMISSION APPARATUS AND RECEIVING APPARATUS

(75) Inventors: Jiyun Shen, Yokohama (JP); Hiromasa Fujii, Yokosuka (JP); Takahiro Asai, Yokosuka (JP); Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 830 days.

(21) Appl. No.: 11/135,413

(22) Filed: May 24, 2005

(65) Prior Publication Data

US 2005/0265226 A1 Dec. 1, 2005

(30) Foreign Application Priority Data

May 25, 2004 (JP) ............................. 2004-155033

(51) Int. Cl.
*H04K 1/10* (2006.01)
(52) U.S. Cl. .................. 375/260; 370/203; 370/204; 370/205; 370/208; 370/210; 370/343; 455/103; 455/126; 455/501; 455/522; 455/561; 455/562.1
(58) Field of Classification Search ............... 370/210
See application file for complete search history.

(56) References Cited

U.S. PATENT DOCUMENTS

| | | | |
|---|---|---|---|
| 6,081,502 A | 6/2000 | Paneth et al. | |
| 6,584,160 B1 | 6/2003 | Amrany et al. | |
| 7,376,074 B2 * | 5/2008 | Jung et al. | 370/208 |
| 2002/0105947 A1 * | 8/2002 | Kitagawa et al. | 370/366 |
| 2002/0181610 A1 * | 12/2002 | Sumasu et al. | 375/296 |
| 2003/0086507 A1 * | 5/2003 | Kim et al. | 375/297 |

OTHER PUBLICATIONS

Mathias Friese, "On the degradation of OFDM-signals due to peak-clipping in optimally predistorted power amplifiers", Proc. of GLOBCOM '98, Nov. 1998, pp. 939-944.

Xiaodong Li, et al., "Effects of clipping and filtering on the performance of OFDM", IEEE Communications Letters, vol. 2, No. 5, May 1998, pp. 131-133.

Leonard J. Cimini, Jr., et al., "Peak-to-Average Power Ratio Reduction of an OFDM Signal Using Partial Transmit Sequences", IEEE Communications Letters, vol. 4, No. 3, Mar. 2000, pp. 86-88.

(Continued)

*Primary Examiner*—Shuwang Liu
*Assistant Examiner*—Dhaval Patel
(74) *Attorney, Agent, or Firm*—Oblon, Spivak, McClelland, Maier & Neustadt, L.L.P.

(57) ABSTRACT

A transmission apparatus used in a radio communication system adopting the OFDM scheme is disclosed. The transmission apparatus includes: a dividing inverse Fourier transform part including plural transform parts, wherein the dividing inverse Fourier transform part divides a signal to be transmitted into plural signals, and each of the plural transform parts performs inverse Fourier transform on one of the plural signals; a peak control part for outputting a peak control signal based on peaks that are detected from output signals of the dividing inverse Fourier transform part; and a peak reducing process part for adjusting a weight or an arranging order of an output signal of the dividing inverse Fourier transform part according to the peak control signal to output an adjusted signal, and synthesizing the adjusted signal with other signal so as to output a synthesized signal.

11 Claims, 18 Drawing Sheets

OTHER PUBLICATIONS

Stefan H. Müller, et al., "A Novel Peak Power Reduction Scheme for OFDM", Proc. Of PIMRC '97, 1997, pp. 1090-1094.

G. Hill, et al., "Cyclic Shifting and Time Inversion of Partial Transmit Sequences to Reduce the Peak-to-Average Power Ratio in OFDM", Personal, Indoor and Mobile Radio Communications, 2000. PIMRC 2000., The $11^{TH}$ IEEE International Symposium., vol. 2, XP010520833, Sep. 18, 2000, pp. 1256-1259.

Young-Hwan You, et al., "OFDM-CDMA with Low PAPR Using Cyclic-Shifted Sequence Mapping", IEICE Transactions on Fundamentals of Electronics, Communications and Computer Sciences, Institute of Electronics Information and Communication Engineering, vol. E86-A, No. 12, XP001186936, Dec. 2003, pp. 3310-3313.

Chih-Chun Feng, et al., "Protection and Transmission of Side Information for Peak-to-Average Power Ratio Reduction of an OFDM Signal Using Partial Transmit Sequences", Vehicular Technology Conference, 2003. VTC 2003-Fall., 2003 IEEE $58^{th}$, XP010701760, Oct. 6, 2003, pp. 2461-2465.

Patent Abstracts of Japan, JP 08-274748, Oct. 18, 1996.

* cited by examiner

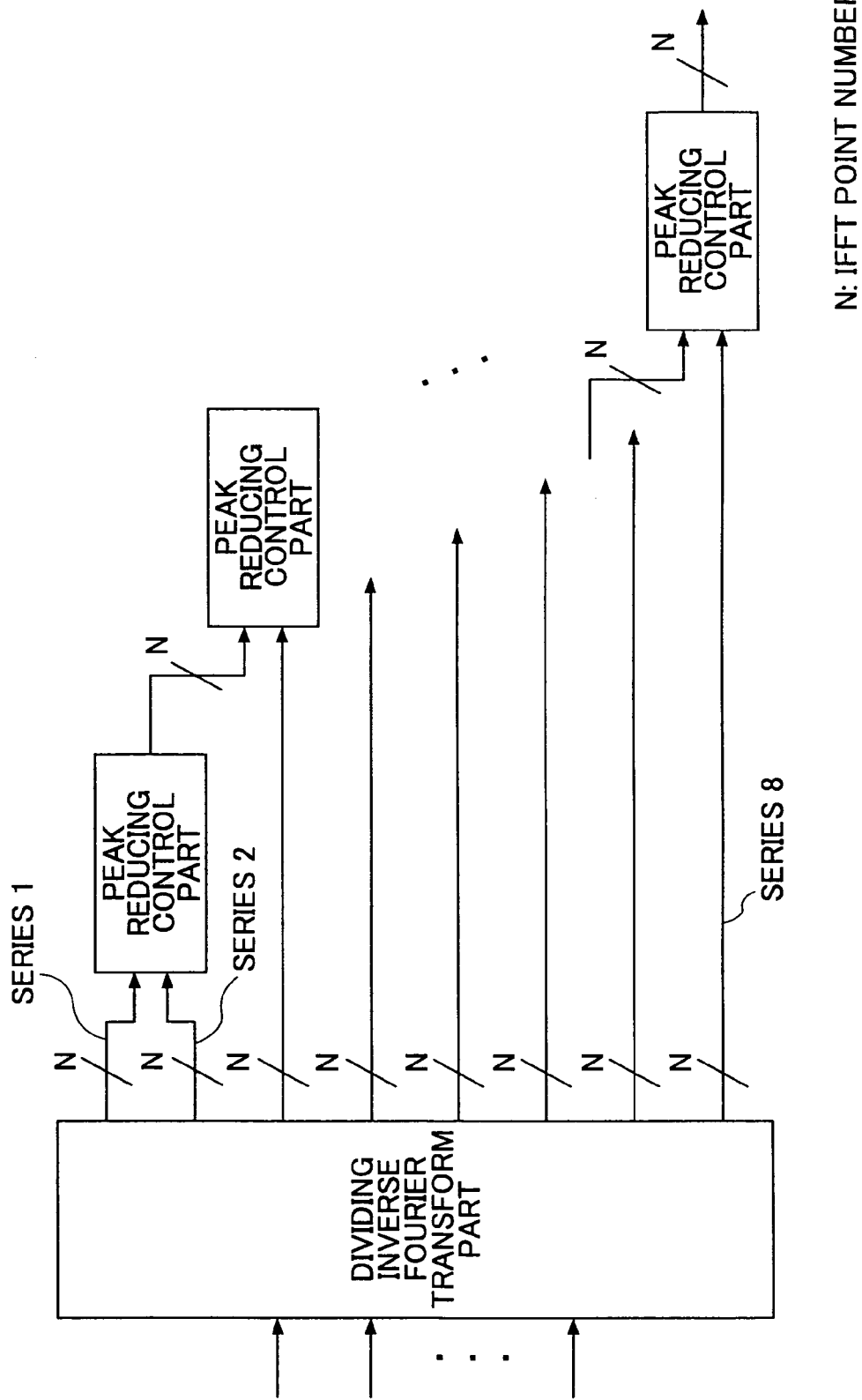

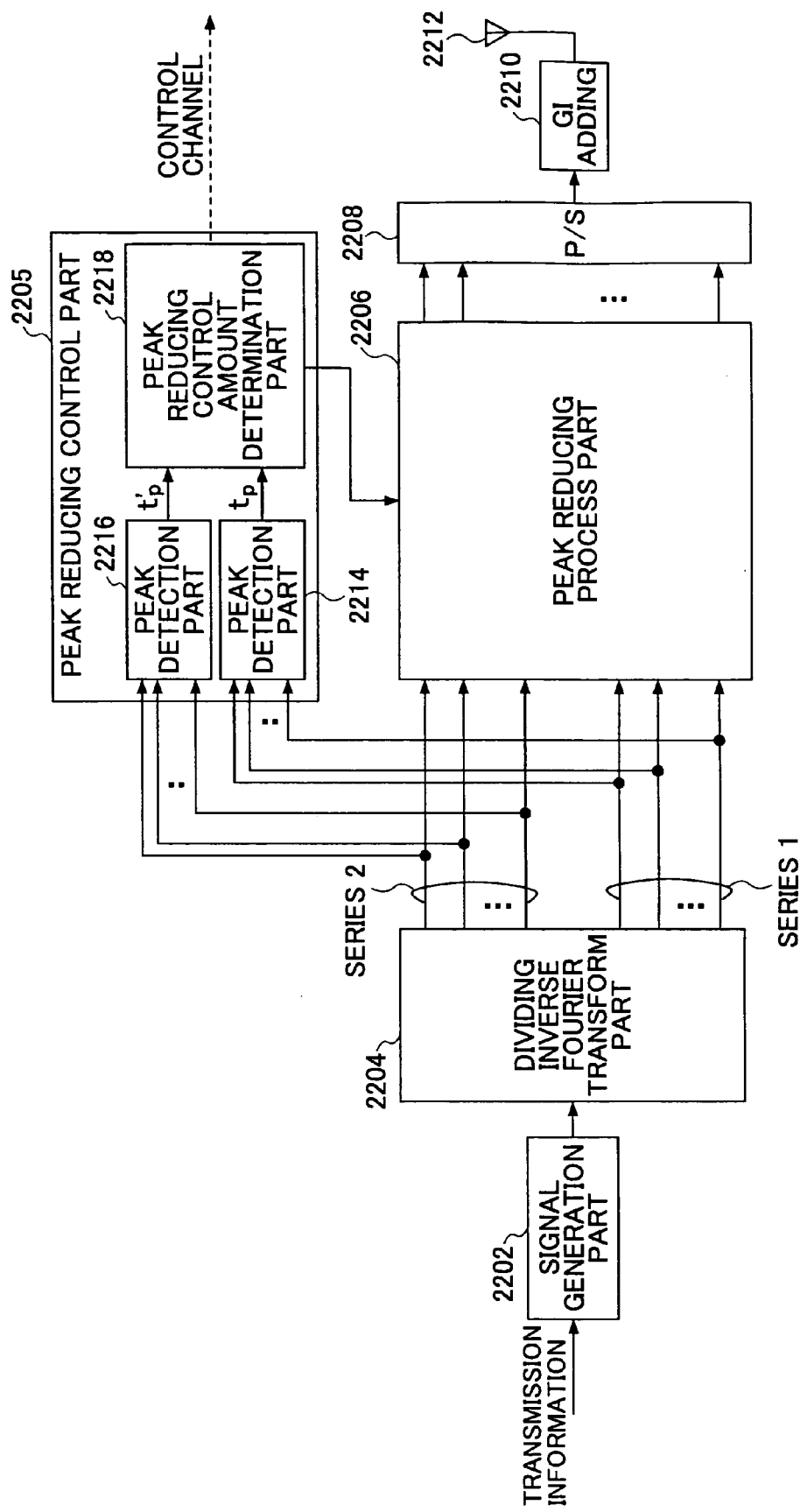

ial fast Fourier transform part in some cases as shown in FIG. 3. The ratio of a possible maximum peak power to an average power is referred to as PAPR (Peak to Average Power Ratio). Generally, the maximum peak power may become the number of all sub-carriers times greater than average power.

TRANSMISSION APPARATUS AND RECEIVING APPARATUS

BACKGROUND OF THE INVENTION

1. Field of the Invention

The present invention relates to the field of radio communications. More particularly, the present invention relates to a transmission apparatus and a receiving apparatus that adopt the OFDM (Orthogonal Frequency Division Multiplexing) scheme.

2. Description of the Related Art

The OFDM scheme, which is getting attention in the field of radio communications, is a technology for realizing good signal transmission even under a multipath transmission environment by arranging plural carriers (sub-carriers) at intervals of a frequency such that the plural carriers are orthogonal to each other. In a transmission apparatus in this scheme, as shown in FIG. 1 briefly, a source signal is generated in a signal generation part based on transmission information. The signal is converted to a parallel signal series by a serial-parallel conversion part (S/P), processed by an inverse fast Fourier transform part (IFFT part), and converted to a serial signal series by a parallel-serial conversion part (P/S). Then, a guard interval is added in a guard interval adding part (GI), and the signal is amplified by a power amplifying part (PA) so as to be transmitted as an OFDM signal by radio. As is generally known, the guard interval is a copy of an end part of the transmission symbol. On the other hand, in the receiving apparatus, as shown in FIG. 2, the guard interval is removed from a received signal by a guard interval removing part, the received signal is converted to parallel signals by a serial-parallel conversion part (S/P), the parallel signals are transformed by a fast Fourier transform part (FFT part), and are converted to a serial signal by a parallel-serial conversion part (P/S), and further demodulated in a signal detection part so that the transmission information is obtained.

In the OFDM scheme, since various sub-carriers are used, compared to the average amplitude, a signal with very large peak amplitude may be generated after the inverse fast Fourier transform part in some cases as shown in FIG. 3. The ratio of a possible maximum peak power to an average power is referred to as PAPR (Peak to Average Power Ratio). Generally, the maximum peak power may become the number of all sub-carriers times greater than average power.

On the other hand, as shown in FIG. 4, the power amplifier (PA) has a linear region that provides linear input/output characteristics and a non-linear region that provides non-linear input/output characteristics. For outputting a transmission signal having small distortion, it is desirable that the power amplifier (PA) operate in the linear region. If the power amplifier (PA) operates in the non-linear region, there may arise problems such as degraded transmission quality, and unwanted emission to outside of the band. When the PAPR is large, the power amplifier is being used not only in the linear region but also in the non-linear region. A power amplifier having a wide liner region may be used, but it sacrifices power efficiency. Therefore, it is desirable that the PAPR of the transmission signal be small.

In a first document (M. Friese, "On the degradation of OFDM-signals due to peak-clipping in optimally predistorted power amplifiers, Proc. of GLOBCOM '98, pp. 939-944, November 1998), a so-called pre-distortion scheme is adopted, in which inverse characteristics of the distortion are weighted on a signal input to an amplifier, which enables amplifying the signal linearly if it is below the saturation level.

In a second document (X. Li and L. J. Cimini, "Effects of clipping and filtering on the performance of OFDM", IEEE Commun. Lett., vol. 2, no. 5, pp. 131-133, May 1998), a large peak value is clipped for reducing PAPR.

In addition, a technology called PTS (Partial Transmit Sequence) is known, in which a combination of phase rotation amounts is selected for a transmission signal from among plural combinations of phase rotation amounts that are set for each sub-carrier, so that the phase is rotated for each sub-carrier to reduce PAPR (refer to the following documents:

L. J. and N. R. Sollenberger, "Peak-to-Average power ratio reduction of an OFDM signal using partial transmit sequences", IEEE Commun. Lett., vol. 4, no. 3, pp. 86-88, March 2000 (third document);

S. H. Muller and J. B. Huber, "A Novel Peak Power Reduction Scheme for OFDM", Proc. of PIMRC '97, pp. 1090-1094, 1997 (fourth document);

G. R. Hill, Faulkner and J. Singh, "Reducing the peak-to-average power ratio in OFDM by cyclically shifting partial transmit sequences" Electronics Letters, vol. 36, No. 6, 16 Mar. 2000 (fifth document)).

FIG. 5 shows an example of a transmission apparatus adopting the PTS scheme. FIG. 6 shows an example of a receiving apparatus adopting the PTS scheme. In the examples shown in the figures, a signal series generated in the signal generation part is divided into two signal series. On each of the two signal series, serial-parallel conversion and inverse Fourier transform are performed. Each of inverse Fourier transform parts $IFFT_{1,2}$, each having N input-output points, receives N/2 signals and N/2 null symbols from the serial-parallel conversion part. The phase rotation amount control part determines proper phase rotation amounts $\{\theta_1, \theta_2, \ldots\}$ so that one of them is commonly supplied to each multiplying part. Outputs from the inverse Fourier transform part are synthesized with proper weights in the synthesizing part. The signal group, on which inverse Fourier transform has been performed, and that has been synthesized is converted to a serial signal in a parallel-serial conversion part (P/S), the guard interval is added to the serial signal in the guard interval part (GI), so that the signal is transmitted from the antenna. In the receiving side, as shown in FIG. 6, the phase rotation amount is compensated for when the received signal is demodulated.

However, the pre-distortion scheme clips a part of a signal having a peak power level exceeding a saturation region of the amplifier.

In the method in which an unwanted peak power value is clipped, orthogonality among sub-carriers collapses, so that interference between symbols increases and receiving quality may be degraded.

With regard to the PTS method, it is necessary to perform complex multiplication for each signal series when supplying a weight to each signal so that complexity increases. This problem is disadvantageous especially for consumed power, circuit size and the like. It can be considered to decrease kinds of the weights to be supplied to the signal series so as to decrease calculation work load for generating the transmission signal. However, by reducing the kinds of the weights, effectiveness of weight adjustment is greatly limited.

Further, the weight to be supplied is used merely for adjusting the phase. Assuming that a signal having a peak power before being synthesized in the synthesizing part is $S_p$, and that a part of the OFDM signal by which a weight $(\exp(j\theta))$ is multiplied is S, an output from the synthesizing part is $S_p + \exp(j\theta)S$, wherein the phase rotation amount $\theta$ is determined such that the peak amplitude of the synthesized signal becomes small. However, when the amplitude of the signal S is very small, it is difficult to reduce the amplitude of the synthesized signal by adjusting the phase rotation amount θ.

In addition, it is difficult to easily obtain the shift amount in the conventional cyclic shift method and it is difficult to easily obtain the phase rotation amount in the conventional PTS method, so that control for reducing the peak is difficult in the conventional technology. Further, calculation work load related to control increases as the number of signal series obtained by the dividing inverse Fourier transform part increases, which is disadvantageous especially for a small mobile terminal.

SUMMARY OF THE INVENTION

The present invention is contrived to solve at least one of the above-mentioned problems. An object of the present invention is to provide a transmission apparatus and a receiving apparatus that use the OFDM scheme and that can reduce the PAPR of an OFDM radio signal.

The object is achieved by a transmission apparatus used in a radio communication system adopting the OFDM scheme, the transmission apparatus including:

a dividing inverse Fourier transform part including plural transform parts, wherein the dividing inverse Fourier transform part divides a signal to be transmitted into plural signals, and each of the plural transform parts performs inverse Fourier transform on one of the plural signals;

a peak control part for outputting a peak control signal based on peaks that are detected from output signals of the dividing inverse Fourier transform part; and a peak reducing process part for adjusting a weight or an arranging order of an output signal of the dividing inverse Fourier transform part according to the peak control signal to output an adjusted signal, and synthesizing the adjusted signal with another signal so as to output a synthesized signal.

According to the present invention, PAPR of the radio signal can be reduced.

BRIEF DESCRIPTION OF THE DRAWINGS

Other objects, features and advantages of the present invention will become more apparent from the following detailed description when read in conjunction with the accompanying drawings, in which:

FIG. 21 is a block diagram showing a modified example of a peak reducing process part;

FIG. 22 is a partial block diagram of the transmission apparatus according to an embodiment of the present invention.

DETAILED DESCRIPTION OF THE PREFERRED EMBODIMENTS

Figure 1:
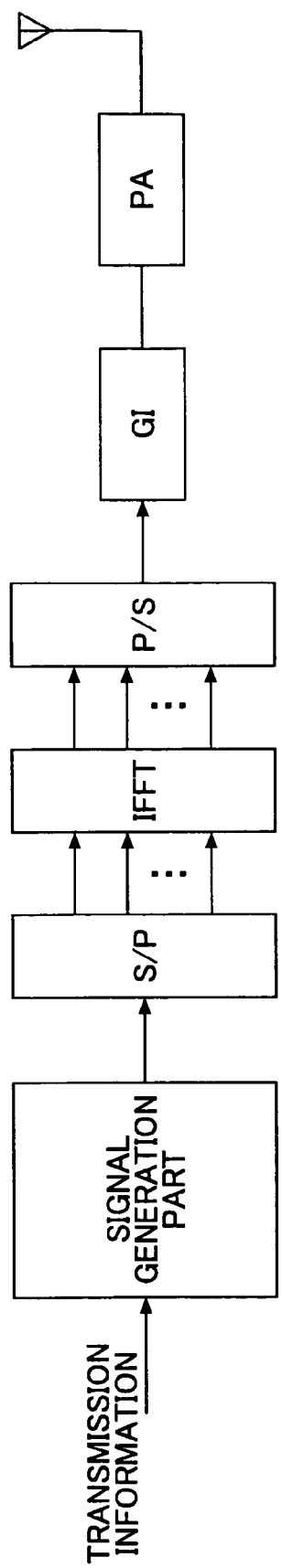
FIG. 1 is a schematic block diagram of a transmission apparatus adopting the OFDM scheme.
Figure 2:
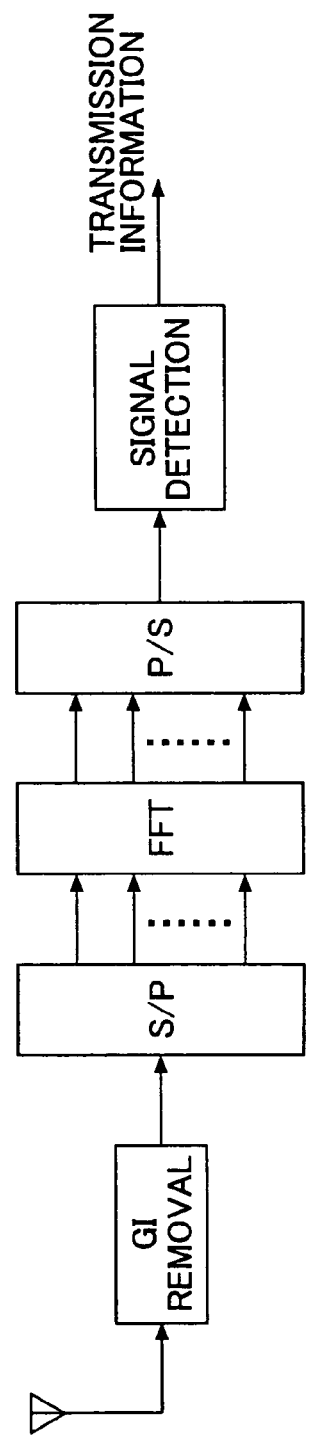
FIG. 2 is a schematic block diagram of a receiving apparatus adopting the OFDM scheme.
Figure 3:
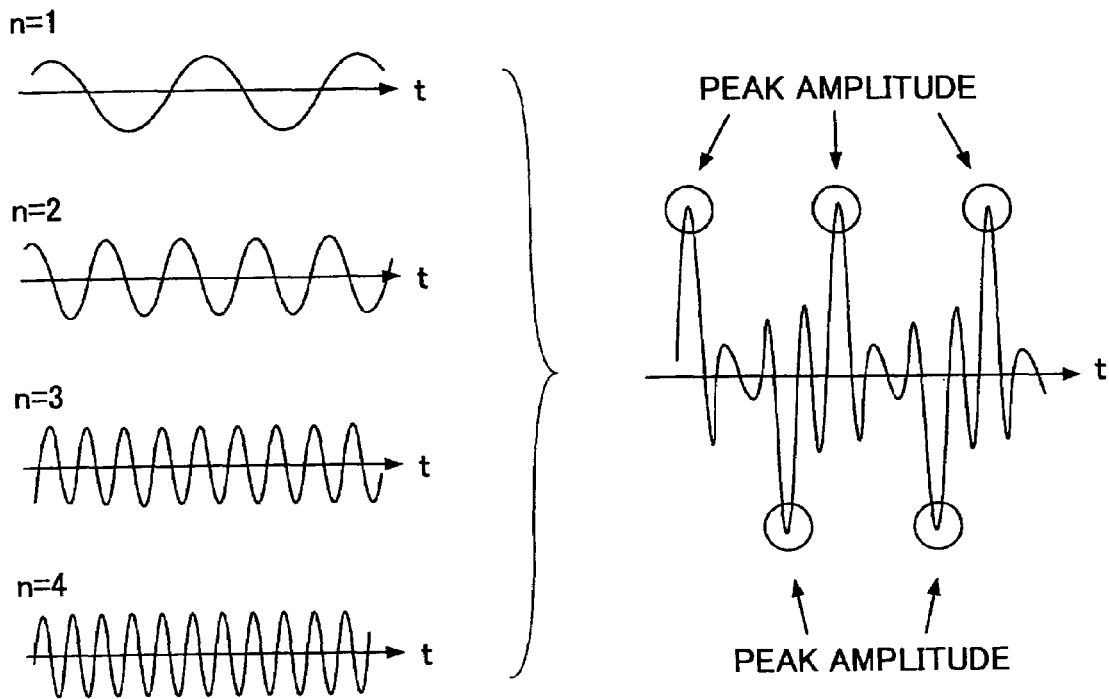
FIG. 3 shows an OFDM signal.
Figure 4:
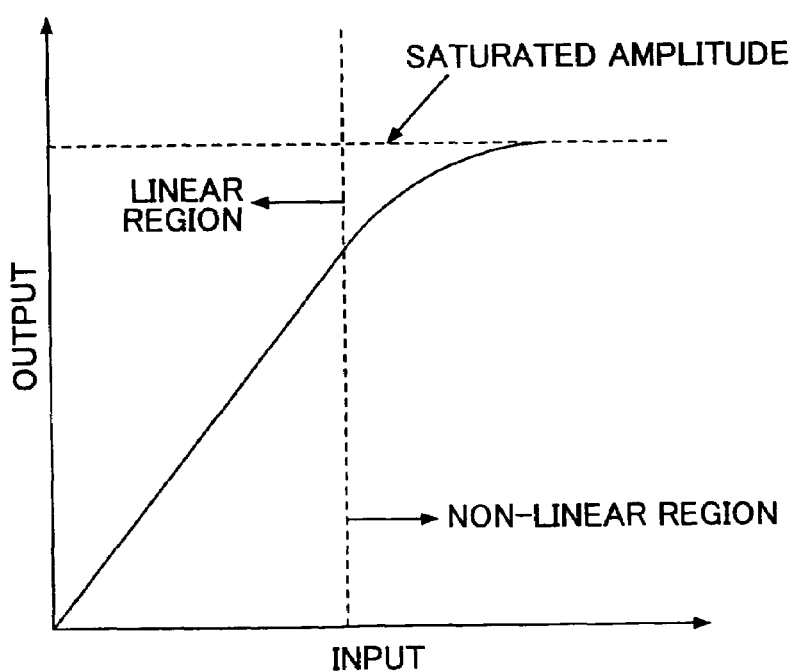
FIG. 4 shows input-output characteristics of a power amplifier.
Figure 5:
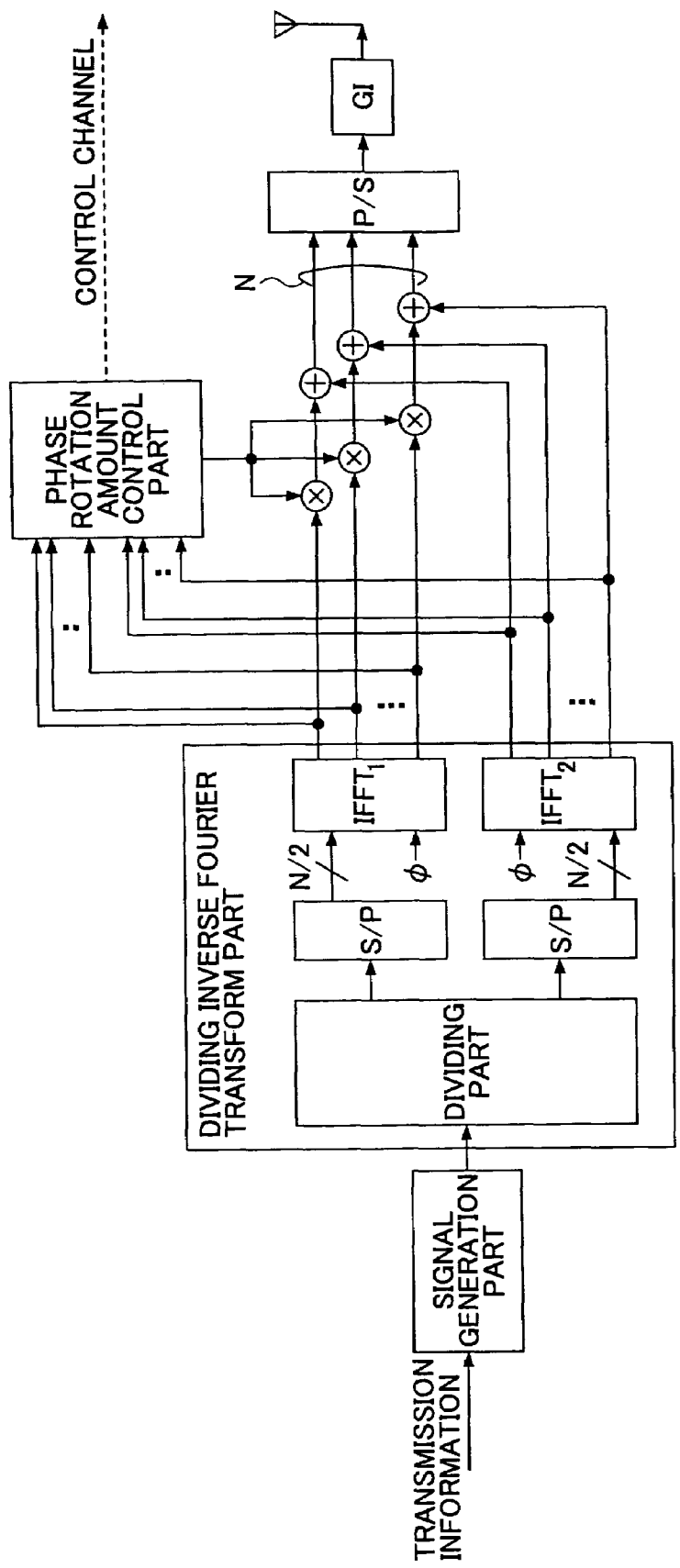
FIG. 5 is a schematic block diagram of a transmission apparatus adopting the PTS scheme.
Figure 6:
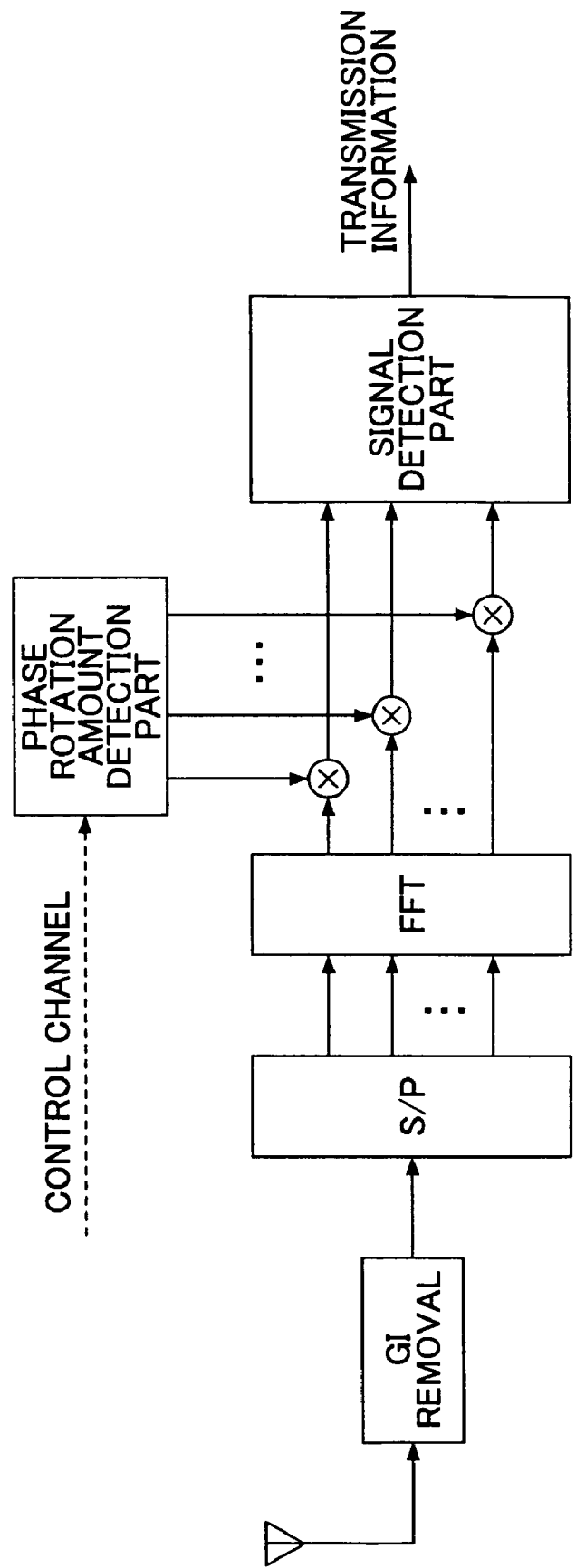
FIG. 6 is a schematic block diagram of a receiving apparatus adopting the PTS scheme.

In the following, embodiments of the present invention are described with reference to figures.

Outline of the Embodiments

According to an embodiment of the present invention, the peak of the signals output from the plural transform parts are detected for each transform part, peak control information is output based on the detection result, and a weight or arranging order of an output signal of the dividing inverse Fourier transform part is determined according to the peak control signal. Accordingly, PAPR can be reduced with small calculation work load, so that circuit size can be decreased.

According to an embodiment of the present invention, the peak detection part detects a predetermined number of peaks of the output signal of one of the plural transform parts, and the peak control signal is generated such that the predetermined number of peaks is reduced. Accordingly, for example, plural peaks can be reduced at the same time.

According to an embodiment of the present invention, the peak reducing process part includes: a cyclic shift part for shifting the arranging order of the output signal output from at least one of the plural transform parts; and a synthesizing part for synthesizing an output from the cyclic shift part with an output from a transform part other than the at least one of the plural transform parts. Accordingly, PAPR can be effectively reduced by the improved cyclic shift method.

According to an embodiment of the present invention, the peak reducing process part includes: a weight adjusting part for adjusting an amplitude and/or a phase of the output signal output from at least one of the plural transform parts according to the peak control signal; and a synthesizing part for synthesizing an output from the weight adjusting part with an output from a transform part other than the at least one of the plural transform parts. Accordingly, PAPR can be effectively reduced by the improved PTS method.

According to an embodiment of the present invention, the dividing inverse Fourier transform part includes at least first, second and third transform parts each performing inverse Fourier transform, the peak reducing process part adjusts a weight or an arranging order of the output signal output from the first transform part according to the peak control signal to output a first adjusted signal, the synthesizing part synthesizes the first adjusted signal with a signal output from the second transform part to output a synthesized signal, and the peak reducing process part adjusts a weight or an arranging order of the synthesized signal according to the peak control signal to output a second adjusted signal, and the synthesizing part synthesizes the second adjusted signal with a signal output from the third transform part. Accordingly, many signals can be flexibly processed even by using small peak reducing process parts, instead of using a large-sized peak reducing process part that can process many signals at one time.

According to an embodiment of the present invention, the transmission apparatus includes plural peak reducing process parts. For example, a second peak reducing process part is provided for synthesizing a signal output from a first peak reducing process part with other signal according to the peak control signal so as to output a synthesized signal. In addition, according to an embodiment of the present invention, the other signal synthesized with the signal output from the peak reducing process part is signal output from a third peak reducing process part.

According to an embodiment of the present invention, plural frequency groups each including plural sub-carriers are provided, and the peak reducing process part adjusts a phase and/or arranging order of the output signal for each frequency group, and a second pilot signal is multiplexed with an input signal of the peak reducing process part, and a first pilot signal is multiplexed with an output signal of the peak reducing process part, so that the second pilot signal and the first pilot signal are transmitted. In the receiving side, by comparing the first pilot signal with the second pilot signal, information on the peak reducing process can be known. In addition, according to an embodiment of the present invention, the second pilot signal is inserted in a part of sub-carriers.

According to an embodiment of the present invention, by averaging plural channel estimation values calculated from the plural first pilot signals inserted in the same frequency group, the channel estimation value can be corrected. Accordingly, the channel estimation value can be obtained accurately so that effect of noise can be effectively reduced.

According to an embodiment of the present invention, a peak position of the peak is detected from the output signal of the dividing inverse Fourier transform part, and the weight or the arranging order is determined such that the amplitude of the synthesized signal becomes small at the peak position. Accordingly, the transmission signal can be generated easier than in the conventional technology. In the conventional technology, candidates of transmission signals are generated for all weight candidates corresponding to an information bit series, and a candidate having the smallest peak is determined as a final transmission signal. Therefore, it is not easy to generate the transmission signal in the conventional technology.

According to an embodiment of the present invention, since the second pilot signal is assigned to a low-frequency sub-carrier, many distinguishable cyclic shift amounts can be kept.

According to an embodiment of the present invention, a feedback route is provided between the synthesizing part and the dividing inverse Fourier transform part, and the feedback route includes a part for subtracting a predetermined threshold from an output, from the synthesizing part, that exceeds the predetermined threshold, and a Fourier transform part for performing Fourier transform on an output from the part. In addition to performing cyclic shifts by the cyclic shift part, by recursively reducing the voltage by using the feedback route, PAPR can be further reduced.

First Embodiment

Figure 7:
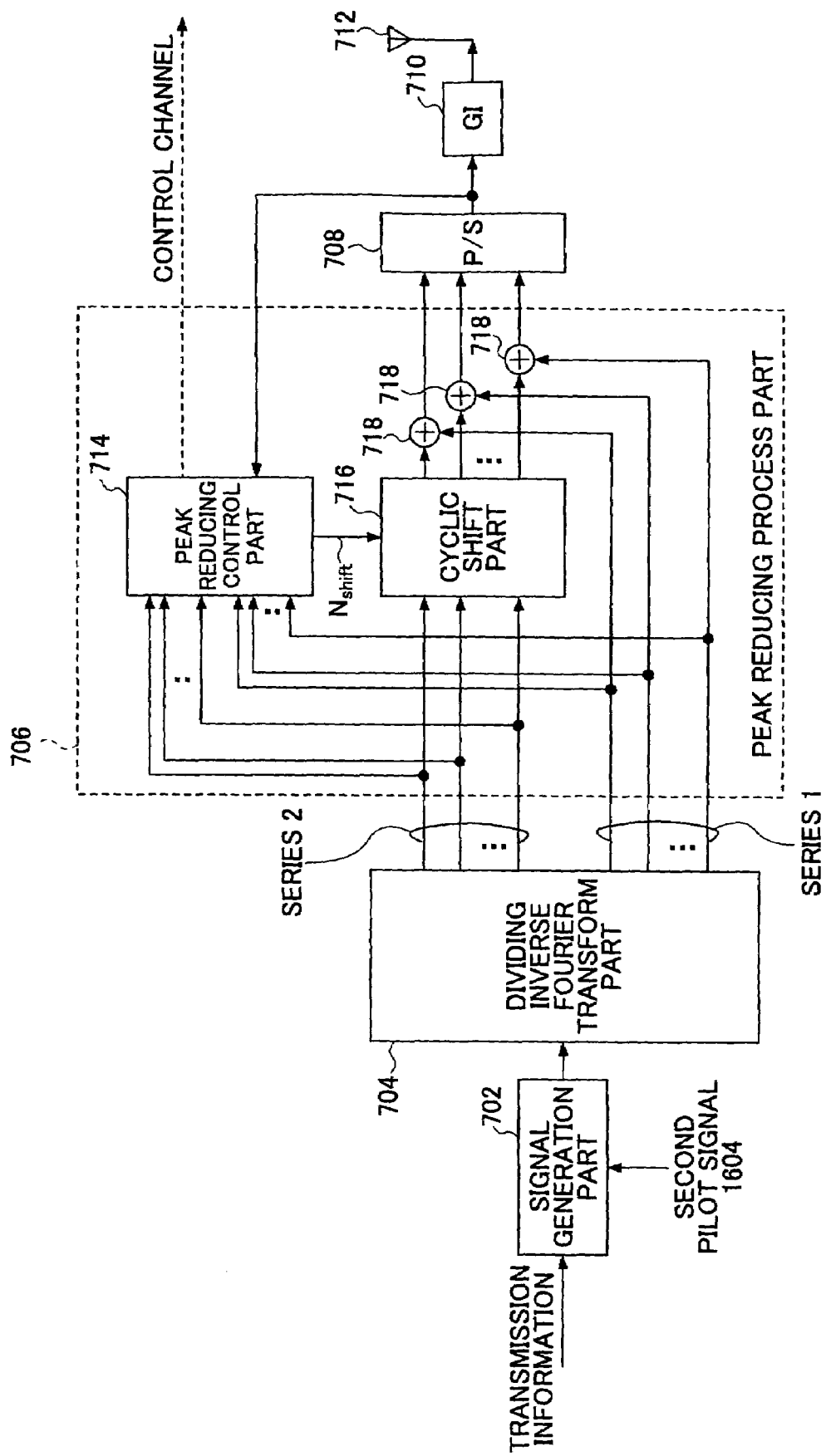
FIG. 7 is a partial block diagram of a transmission apparatus according to an embodiment of the present invention.

FIG. 7 is a partial block diagram showing a part of the transmission apparatus according to an embodiment of the present invention. The transmission apparatus includes a signal generation part 702, a dividing inverse Fourier transform part 704, a peak reducing process part 706, a parallel-serial conversion part (P/S) 708, a guard interval adding part 710, and an antenna 712. The peak reducing process part 706 includes a peak reducing control part 714, a cyclic shift part 716 and plural synthesizing parts 718.

The signal generation part 702 receives a bit sequence indicating transmission information, and generates signal information corresponding to each sub-carrier so as to output the signals as a signal series.

Figure 8:
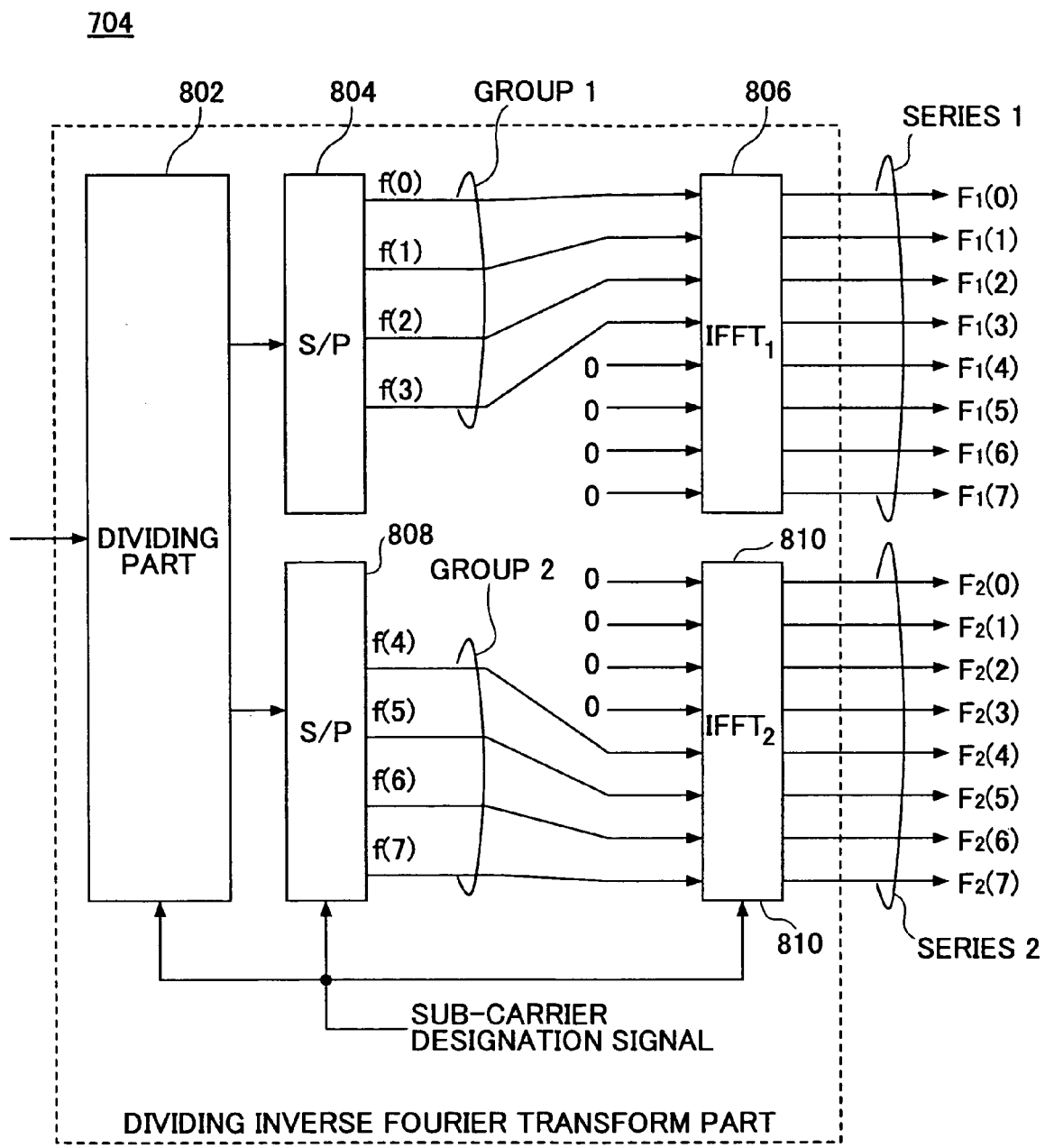
FIG. 8 is a detailed block diagram of a dividing inverse Fourier transform part.

As shown in FIG. 8 in detail, the dividing inverse Fourier transform part 704 receives a signal, and outputs a signal series 1 and a signal series 2 as two signal groups on which inverse Fourier transform has been performed. In the present embodiment, although two signal series 1 and 2 are output for the sake of simplicity, more signal series may be output.

The peak reducing process part 706 generates, based on the signal series 1 and 2, a signal group in which the PAPR is reduced.

The peak reducing control part 714 outputs after-mentioned cyclic shift information $N_{shift}$ indicating proper shift amounts for the signal series 1 and 2. In addition, the cyclic shift information $N_{shift}$ may be transmitted via a control channel by radio.

The cyclic shift part 716 performs cyclic shifts on the signals in the series 2 such that the arranging order of the signals becomes an order indicated by the cyclic shift information $N_{shift}$.

The synthesizing part 718 synthesizes (adds) signals of the cyclic-shifted series 2 with signals of the series 1.

The parallel-serial conversion part (P/S) 708 converts plural parallel signals to a serial signal series.

The guard interval adding part (GI) 710 adds a guard interval to the signal series so as to generate the OFDM signal to be transmitted from the antenna 712.

FIG. 8 shows a detailed block diagram of the dividing inverse Fourier transform part 704. The dividing inverse Fourier transform part 704 includes a dividing part 802, a first serial-parallel conversion part 804, a first inverse fast Fourier transform part 806, a second serial-parallel conversion part 808 and a second inverse fast Fourier transform part 810.

The dividing part 802 divides an input signal into two signals. In this embodiment, although an example in which the signal is divided into two is provided, the signal may be divided into more signals.

The first serial-parallel transform part 804 receives one of the divided signals and converts the signal into N/2 signals (group 1), wherein N indicates the number of signal points of the input and output of the inverse fast Fourier transform. In the example shown in the figure, N=8, so that the first serial-parallel conversion part 804 outputs 8/2=4 signals (information in the frequency domain) f(0), f(1), f(2), and f(3).

The first inverse fast Fourier transform part (IFFT$_1$) 806 receives the N/2 signals and N/2 null symbols, performs inverse fast Fourier transform on these signals so as to output signals of the series 1 that are $F_1(0), F_1(1), F_1(2), F_1(3), F_1(4), F_1(5), F_1(6)$ and $F_1(7)$. A sub-carrier designation signal designates which signal is to be provided to which input point of IFFT$_1$ (for example, the sub-carrier designation signal designates a particular input point to which the null symbol is supplied).

In the same way, the second serial-parallel transform part 808 receives one of the divided signals so as to convert the signal to N/2 parallel signals. In the example shown in the figure, the second serial-parallel conversion part 808 outputs 8/2=4 signals that are f(4), f(5), f(6) and f(7).

The second inverse fast Fourier transform part (IFFT$_1$) 810 receives the N/2 signals and N/2 null symbols, performs inverse fast Fourier transform on these signals so as to output signals of the series 2 that are F$_2$(0), F$_2$(1), F$_2$(2), F$_2$(3), F$_2$(4), F$_2$(5), F$_2$(6) and F$_2$(7). A sub-carrier designation signal designates which signal is to be provided to which input point of IFFT$_2$.

As mentioned above, since the dividing inverse Fourier transform part 704 divides the input signal into signals f(0)~f(3) and f(4)~f(7), the series 1 includes information only on the signals f(0)~f(3), and the series 2 includes information only on signals f(4)~f(7). Generally, in the divided K series, signals (information in the frequency domain) included in k-th series are signals of a [(k−1)×N/K]-th signal to a [k×N/K−1]-th signal, wherein N indicates the number of IFFT points. In the example shown in the figure, k=1 or 2, N=8, and K=2.

In the example shown in FIG. 7, although one of the two series 1 and 2 is connected to the cyclic shift part 716, both series may be connected to the cyclic shift part 716 so as to cyclically shift each of the series 1 and the series 2. However, since the arrangement of the signals is determined based on relative order between the series 1 and the series 2, all possible combinations can be realized by rearranging only one of the series 1 and the series 2. From the view point of downsizing the circuit size, it is desirable to perform cyclic shifts only on a part of the series as shown in the example of the figure.

The operations are described with reference to FIGS. 7 and 8.

The signal generated in the signal generation part 702 is supplied to the dividing part 802 of the dividing inverse Fourier transform part 704. The signal supplied to the dividing part 802 is divided into two signals according to the sub-carrier designation signal, so that the two signals are supplied to the first and second serial-parallel conversion parts 804 and 808, respectively. Each signal supplied to the serial-parallel conversion parts 804 and 808 is converted to four parallel signals, so that the four signals from the serial-parallel conversion part 804 are supplied to the inverse fast Fourier transform part 806 and four signals from the serial-parallel conversion part 808 are supplied to the inverse fast Fourier transform part 810. In each of the inverse fast Fourier transform parts, inverse Fourier transform is performed on the input signals with null symbols, and two signal series 1 and 2 are output from the dividing inverse Fourier transform part 704.

The outputs (the signal groups of the series 1 and the series 2) from the dividing inverse Fourier transform part 704 are supplied to the peak reducing control part 714. The peak reducing control part 714 obtains a peak power value for each of the two signal series, and determines a synthesized power value of the signal series 1 and the signal series 2 wherein the signal series 2 has been rearranged in an order obtained by cyclically shifting the signals in the signal series 2. In the example of the figure, the following cyclic shifts 0~7 can be considered:

shift amount=0: {F$_2$(0), F$_2$(1), F$_2$(2), F$_2$(3), F$_2$(4), F$_2$(5), F$_2$(6), F$_2$(7)}
shift amount=1: {F$_2$(7), F$_2$(0), F$_2$(1), F$_2$(2), F$_2$(3), F$_2$(4), F$_2$(5), F$_2$(6)}
shift amount=2: {F$_2$(6), F$_2$(7), F$_2$(0), F$_2$(1), F$_2$(2), F$_2$(3), F$_2$(4), F$_2$(5)}
shift amount=3: {F$_2$(5), F$_2$(6), F$_2$(7), F$_2$(0), F$_2$(1), F$_2$(2), F$_2$(3), F$_2$(4)}
shift amount=4: {F$_2$(4), F$_2$(5), F$_2$(6), F$_2$(7), F$_2$(0), F$_2$(1), F$_2$(2), F$_2$(3)}
shift amount=5: {F$_2$(3), F$_2$(4), F$_2$(5), F$_2$(6), F$_2$(7), F$_2$(0), F$_2$(1), F$_2$(2)}
shift amount=6: {F$_2$(2), F$_2$(3), F$_2$(4), F$_2$(5), F$_2$(6), F$_2$(7), F$_2$(0), F$_2$(1)}
shift amount=7: {F$_2$(1), F$_2$(2), F$_2$(3), F$_2$(4), F$_2$(5), F$_2$(6), F$_2$(7), F$_2$(0)}

For example, the peak reducing control part 714 adds the signals of the series 2 shifted by a shift amount to signals F$_1$(0), . . . , F$_1$(7) of the series 1, checks a peak power value of the added signals, and determines an order (shift amount N$_{shift}$) of the series 2 such that a minimum peak power value is obtained.

For easily obtaining the shift amount N$_{shift}$, the following method can be adopted, for example. Assuming that a signal in the series 1 is S$_1$ (t), a signal in the series 2 is S$_2$ (t), and that S$_1$(t) includes an amplitude value (peak) greater than that of S$_2$ (t). The peak reducing control part 714 determines such size order of the peak values so as to determine a cyclic shift amount t' based on the following equation:

$$t'=\text{Arg min }[|S_1(t_p)+S_2(t_p+t'')|]$$

wherein t'' indicates a time parameter for cyclically shifting the signals, Arg min indicates a function for returning a time parameter (shift amount) when the argument is a minimum value, tp indicates a time parameter when the signal S$_1$(t) of the series 1 has a maximum value. Accordingly, an optimum shift amount can be obtained easily and with reliability.

Figure 11:
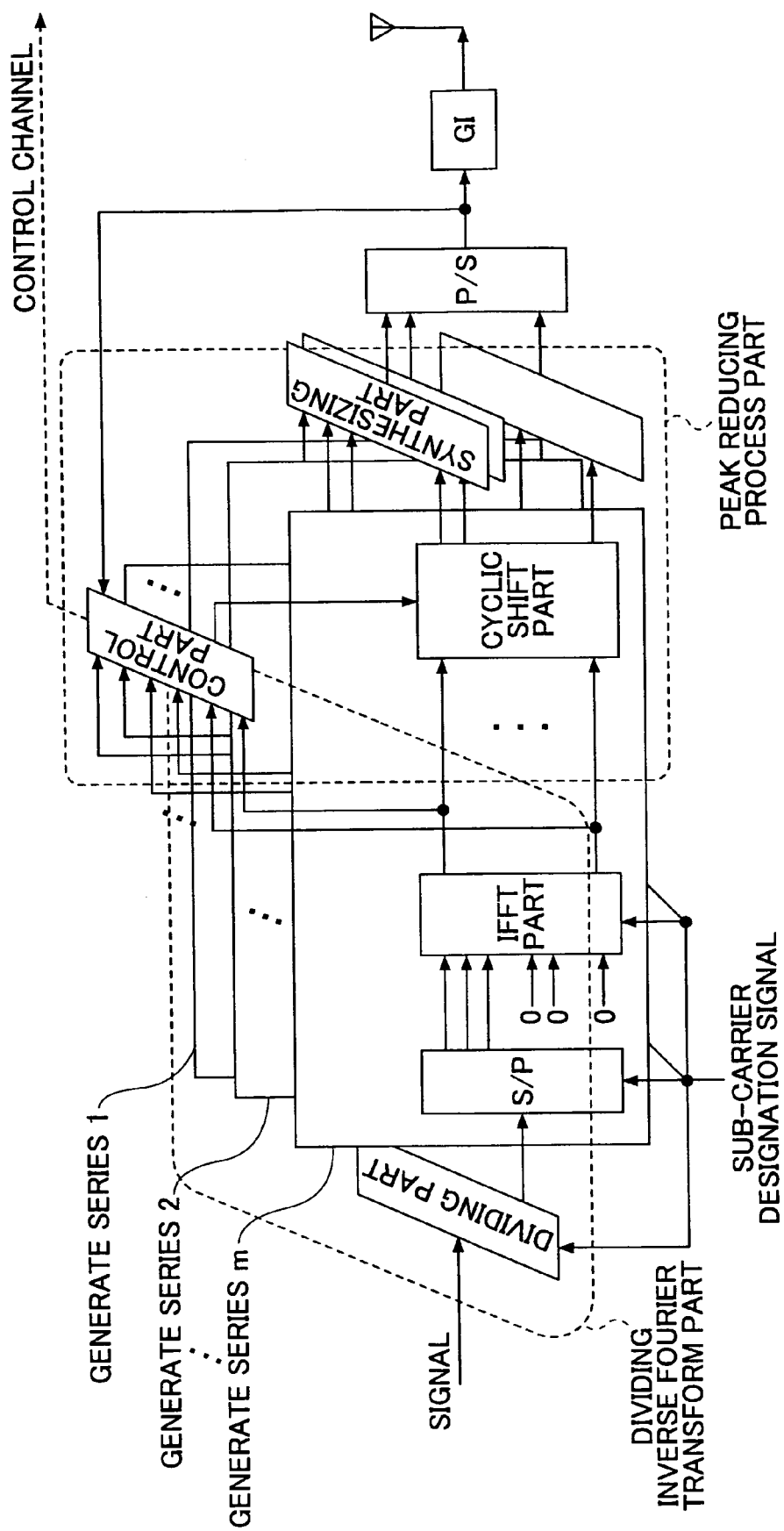
FIG. 11 is a block diagram of a transmission apparatus when an input signal is divided to m signals.

In this embodiment, although an example in which an input signal is divided into two signals is provided, the input signal may be divided into more signals as shown in FIG. 11.

Figure 12:
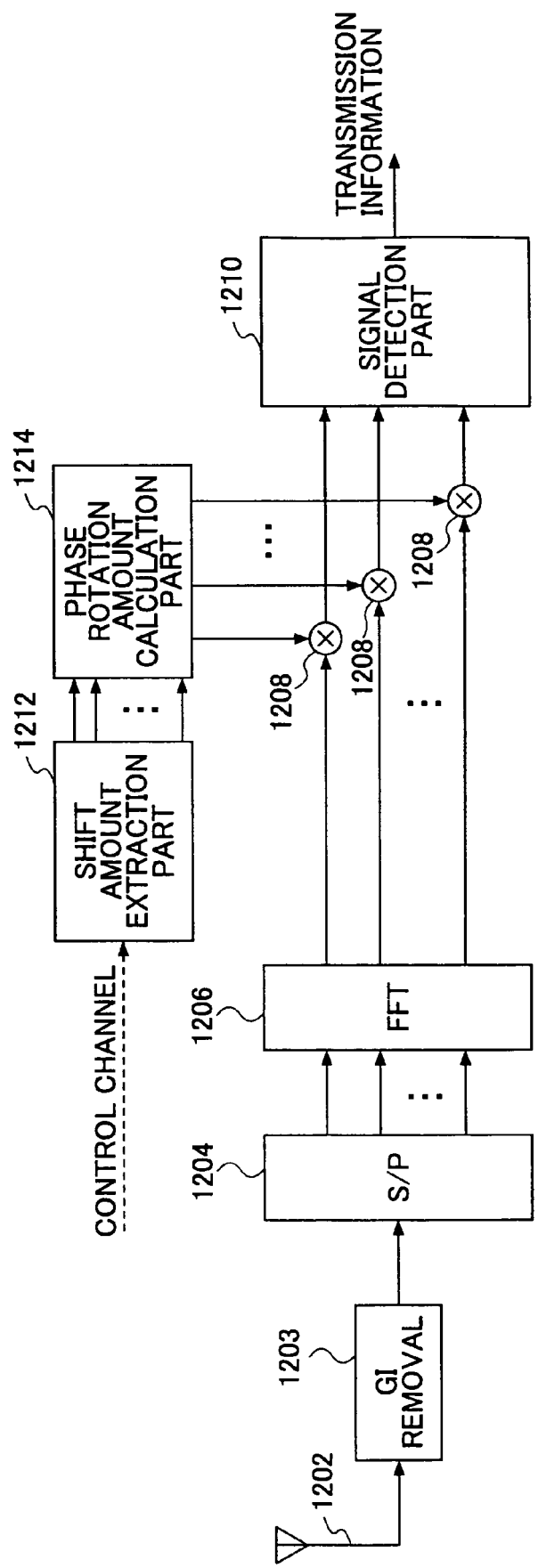
FIG. 12 is a partial block diagram of a receiving apparatus according to an embodiment of the present invention.

FIG. 12 is a schematic block diagram of a receiving apparatus according to an embodiment of the present invention. The receiving apparatus includes an antenna 1202, a guard interval removing part 1203, a serial-parallel conversion part 1204, a fast Fourier transform part (FFT) 1206, plural multiplying parts 1208, a signal detection part 1210, a shift amount detection part 1212 and a phase rotation amount calculation part 1214.

The guard interval removing part 1203 removes the guard interval from the OFDM signal received by the antenna 1202.

The serial-parallel conversion part 1204 converts a received signal to plural parallel signals.

The fast Fourier transform part 1206 performs fast Fourier transform on the plural parallel signals to demodulate the signals.

The multiplying part 1208 supplies a phase rotation on a signal based on an instruction from the phase rotation amount calculation part 1214.

The signal detection part 1210 reconstructs information of a transmitted signal based on the received signal.

The shift amount detection part 1212 obtains the cyclic shift information N$_{shift}$ from the control channel. Alternatively, the cyclic shift information can be estimated from a received signal (pilot signal) on which Fourier transform has been performed as described later.

The phase rotation amount calculation part 1214 obtains a phase rotation amount θ$_n$ to be provided to the received signal based on the detected shift amount.

The signal received from the antenna 1202 is converted to parallel signals after the guard interval is removed. Then, fast Fourier transform is performed on the signals, and the transformed signals are supplied to corresponding inputs of the multiplying parts 1208. In each multiplying part 1208, a phase rotation calculated by the phase rotation amount calculation part 1214 is applied to the corresponding transformed signal. The phase rotation amount $\theta_n$ n can be calculated by the following equation:

$$\theta_n = 2\pi n \times (\text{cyclic shift amount})/(\text{FFT point number } N)$$

wherein n indicates a sub-carrier number. Assuming the example shown in FIGS. 7 and 8, the equation can be represented as:

$$\theta_n = 2\pi n \times (0, 1, 2, 3, 4, 5, 6 \text{ or } 7)/8.$$

Generally, the smaller the value of n is (the smaller the number of sub-carriers is), the greater the number of the kinds of the distinguishable shift amounts is. On the other hand, the larger the value of n is, the smaller the number of the kinds of the shift amounts is.

According to the present embodiment, since the order (shift amount) of the signal series to be synthesized with other series is determined such that the peak power after synthesizing becomes small while cyclically rearranging the order of the signal series, PAPR can be reduced without performing many complex calculations that are necessary in the conventional technology. For example, assuming that the number N of the sub-carriers is 64, the number K of divisions is 8, and that the number of shift patterns (kinds of shift amounts) is 6. In this case, the complexity of inverse fast Fourier transform is $N\log_2 N$. According to the conventional PTS scheme, the number of complex multiplications is (complexity of inverse fast Fourier transform)+(number of sub-carriers)+(number of divisions)×(number of shift patterns)=$64\log_2 64+64\times 8\times 6$. In contrast, according to the present embodiment, complex multiplications are performed only for inverse fast Fourier transform so that the number of complex multiplications is $64\log_2 64=64\times 6$. Therefore, the number of complex multiplications is decreased to $(64\times 6)/(64\times 6+64\times 8\times 6)=1/9$ according to the present embodiment.

Second Embodiment

In the following, some embodiments are described in a case where the transmission apparatus does not directly send data indicating cyclic shift information to the receiving apparatus. In an embodiment, a pilot signal used for channel estimation is OFDM-converted as described in the first embodiment. That is, the pilot signal is supplied to the dividing inverse Fourier transform part 704 (FIG. 7), signal series are combined such that PAPR is reduced in the cyclic shift part 716 and the synthesizing part 718, and the signals are transmitted. In FIG. 7, the pilot signal is represented as a second pilot signal, and examples of using a first pilot signal and a second pilot signal are described later. The pilot signals are transmitted with a signal format shown in FIG. 13, for example. In the figure, "f" indicates a frequency direction, and "t" indicates a time direction. In the example shown in the figure, pilot signals are inserted to all sub-carriers in a time slot. A region enclosed with a dotted line indicates a group, and how the signals are grouped is determined based on the sub-carrier designation signal (FIG. 8) output from a control part that is not shown in the figure. In the same group, the same cyclic shift amount is used. In other words, the cyclic shift amount is updated for each group. Alternatively, instead of using such a control signal, the groups may be predetermined. Further, from the viewpoint of accurately obtaining the channel estimation value, it is desirable to average plural estimation values obtained by pilot signals inserted in adjacent sub-carriers so as to correct the channel estimation value.

Figure 14:
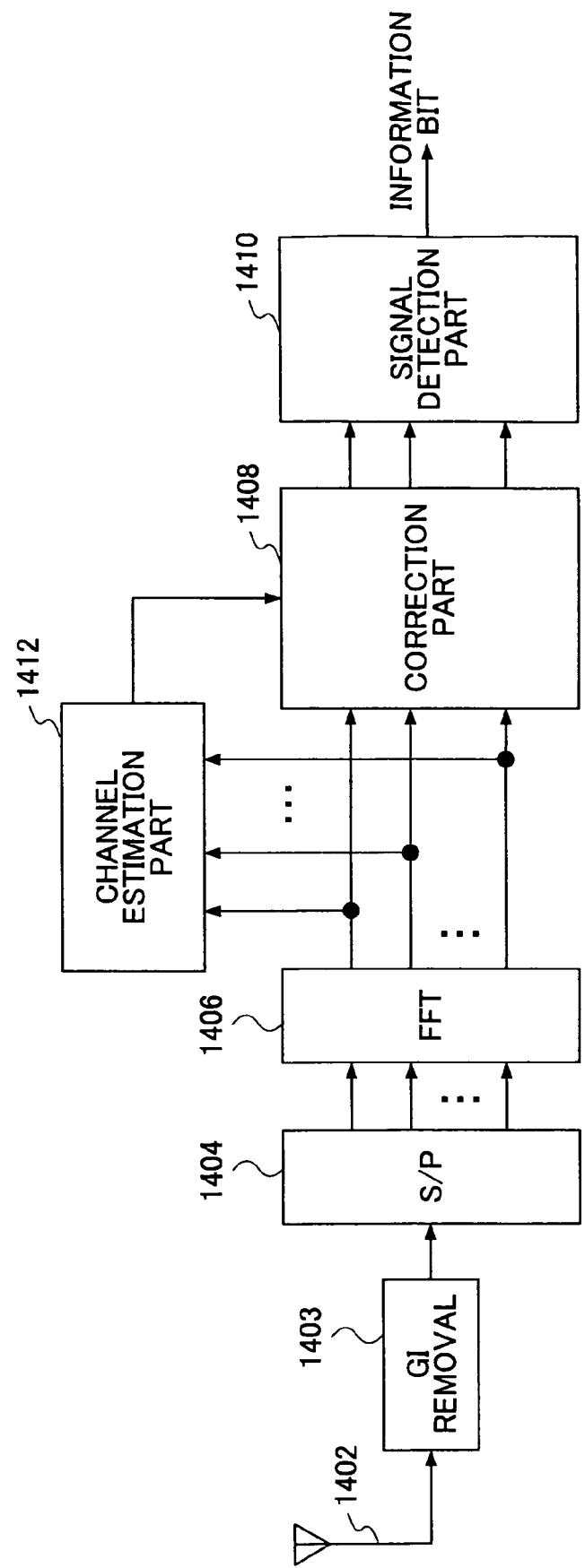
FIG. 14 is a partial block diagram of a receiving apparatus according to an embodiment of the present invention.

FIG. 14 shows a partial block diagram of a receiving apparatus according to an embodiment of the present invention. The receiving apparatus includes an antenna 1402, a guard interval removing part 1403, a serial-parallel conversion part 1404, a fast Fourier transform part (FFT) 1406, and a signal detection part 1410. The receiving apparatus further includes a channel estimation part 1412 and a correction part 1408. The channel estimation part 1412 estimates variations of an amplitude and a phase that are included in a channel by using the pilot signals in the received signal that has been OFDM-modulated (on which Fourier transform has been performed). Then, the channel estimation part 1412 outputs a control signal for compensating for the variations. The correction part 1408 corrects data on each sub-carrier according to the control signal so as to supply the data to the signal detection part 1410.

After the guard interval is removed, the signal received by the antenna 1402 is converted to plural signals, on which fast Fourier transform is performed. Accordingly, OFDM-modulation is performed.

By the way, assuming that a channel impulse response for an n-th sub-carrier is $H_n$, and that a transmission signal for each sub-carrier on the pilot signal is $s_n(t)$, the received signal $s_n'(t)$ is represented by the following equation:

$$s_n'(t) = H_n \exp(j\theta_n) s_n(t)$$

wherein $\theta_n$ indicates an effect of phase change applied in the cyclic shift part. The channel estimation part 1412 estimates $H_n \exp(j\theta_n)$ based on the received signal on which Fourier transform has been performed and a pattern of the known pilot signal. The effect of $H_n \exp(j\theta_n)$ is compensated in the correction part 1408.

Figure 13:
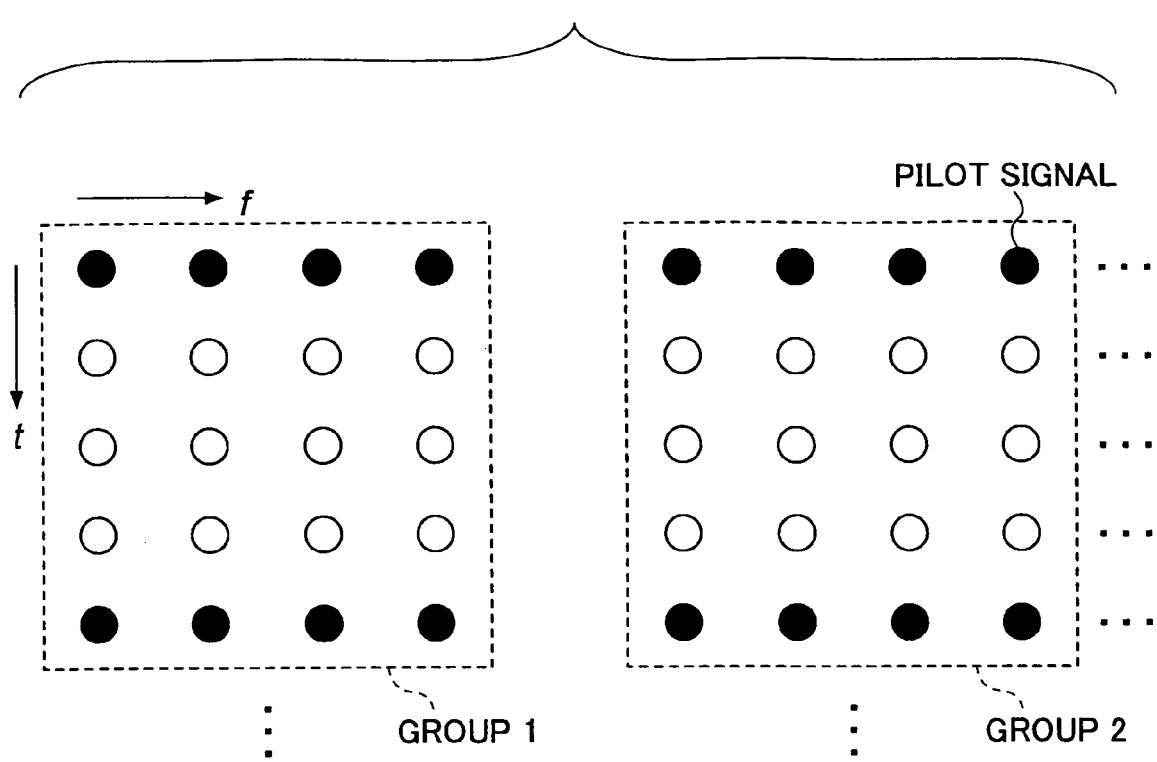
FIG. 13 shows frame formats indicating an example of places for inserting pilot signals.
Figure 15:
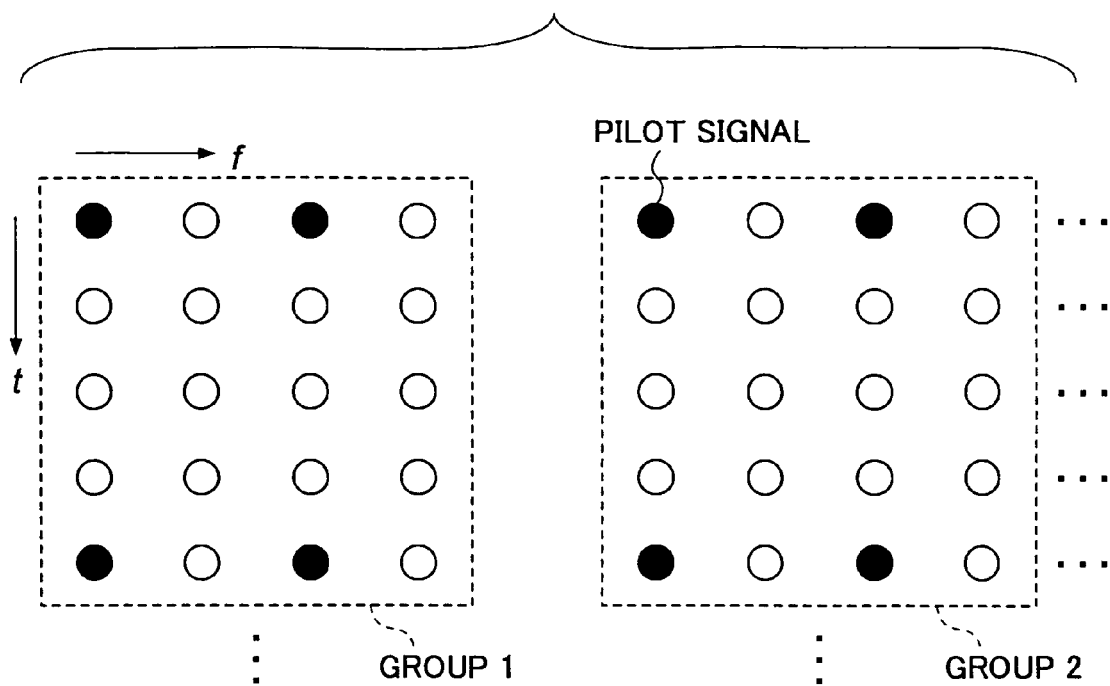
FIG. 15 shows frame formats indicating an example of places for inserting pilot signals.

Although the pilot signals are inserted in all sub-carriers in the example of FIG. 13, the pilot signals may be inserted in a part of sub-carriers as shown in FIG. 15. In this case, the channel estimation value of other sub-carriers can be obtained by interpolation. It should be noted that the interoperation is performed in each group enclosed by a dotted line in the figure. According to the example shown in FIG. 15, overhead of the pilot signals can be reduced so that the transmission rate can be increased.

Figure 16:
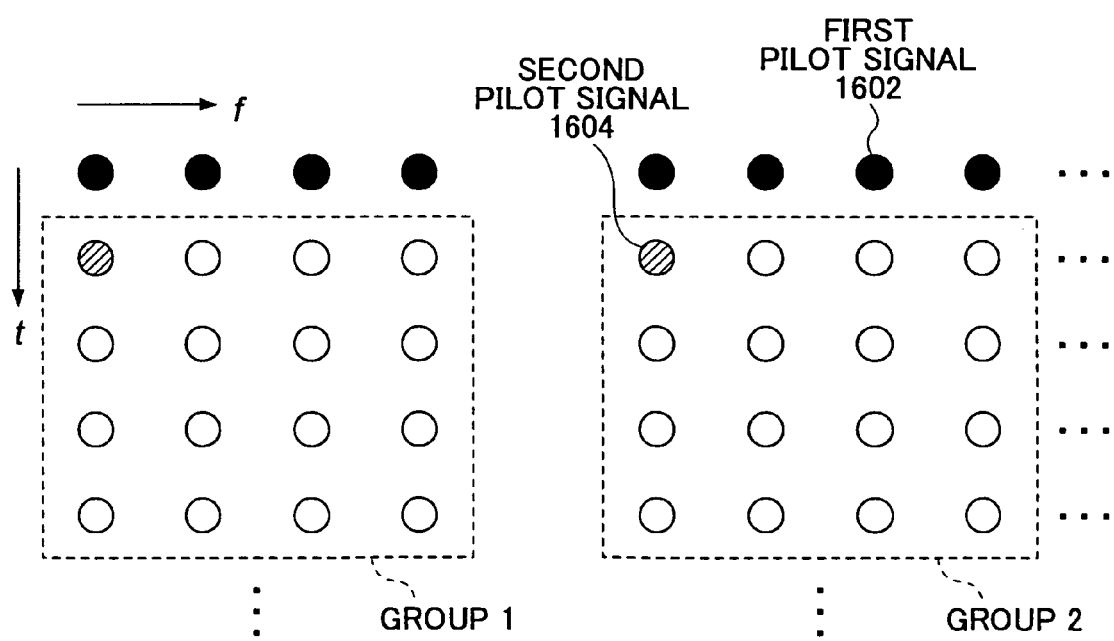
FIG. 16 shows frame formats indicating an example of places for inserting pilot signals.

FIG. 16 shows another example for inserting the pilot signals. In this example, first pilot signals 1602 are inserted in all sub-carriers in a time slot, and a second pilot signal 1604 is inserted in a sub-carrier in another time slot. The first and the second pilot signals represent the same known signal. More specifically, the first pilot signal 1602 is inserted between the cyclic shift part 716 and the parallel-serial conversion part 708 shown in FIG. 7. Different from the first pilot signal, since the second pilot signal 1604 is input to the dividing inverse Fourier transform part 704 shown in FIG. 7 like a data signal, the second pilot signal 1604 is transmitted after being arranged in a proper order in the cyclic shift part 716. Therefore, information on rearrangement in the cyclic shift part 716 is included in the second pilot signal. However, the information is not included in the first pilot signal.

In the receiving apparatus, the channel estimation part 1412 compares the received first pilot signal with the received second pilot signal so that it becomes possible to know only the effect $(\exp(j\theta_n))$ introduced in the cyclic shift part 716. In the examples of FIGS. 13 and 15, $H_n \exp(j\theta_n)$ can be known as a whole, but the breakdown is unknown. By using the first and the second pilot signals, accuracy of correction in the correction part 1408 can be increased. By the way, only one second pilot signal 1604 is inserted in a group since the cyclic shift is performed. When a phase rotation amount $\theta_{n1}$ of an $n_1$-th sub-carrier is determined, a phase rotation amount $\theta_{n2}$ of an $n_2$-th sub-carrier can be obtained by a following equation:

$$\theta_{n2}(n_2/n_1)\theta_{n1}.$$

From the viewpoint of accurately detecting a cyclic shift amount, it is desirable to insert plural second pilot signals in the same group. By the way, the cyclic shift amount that can be determined by the second pilot signal inserted in the n-th sub-carrier satisfies the following relation:

(cyclic shift amount that can be determined) <(FFT point number N)/n

In the example of FIGS. 7 and 8, the FFT point number N is 8, the sub-carrier number n may be a value from 1 to 8. The above relation indicates that, when the sub-carrier number n is large, in other words, when the second pilot signal is inserted in a sub-carrier of a high-frequency, the cyclic shift amounts that can be determined become small. Therefore, from the viewpoint of increasing the cyclic shift amounts that can be determined, it is desirable to insert the second pilot signal into a sub-carrier having a low frequency. It is desirable to insert the second pilot signal in a sub-carrier of the low frequency other than a direct current component in IFFT in the OFDM scheme.

Figure 17:
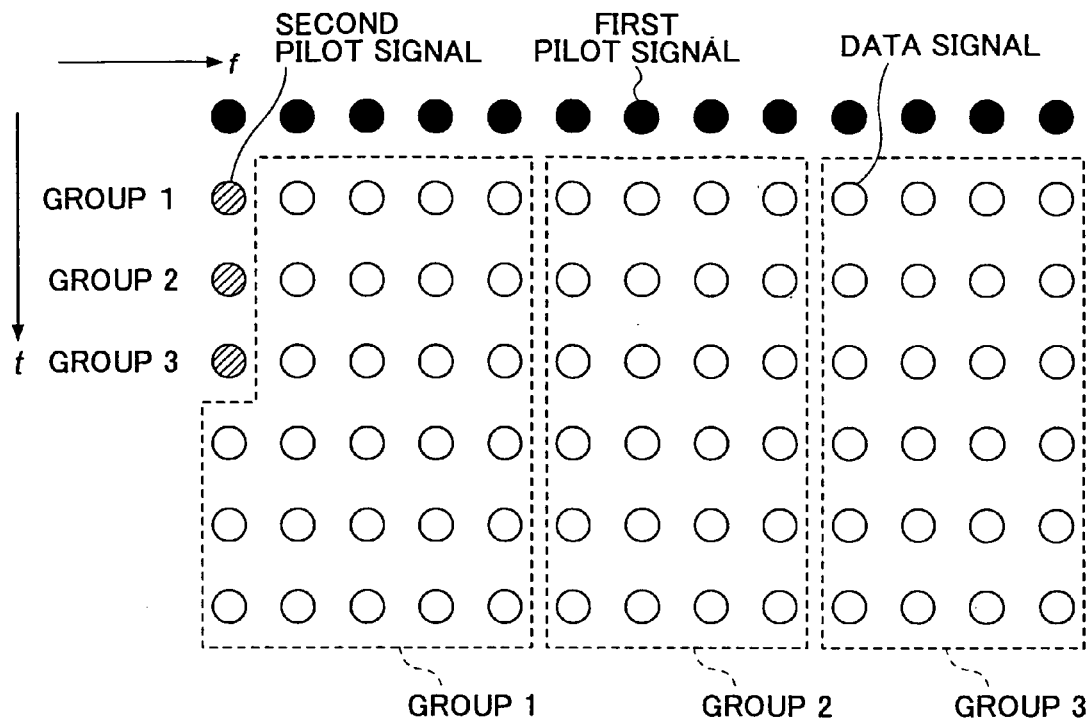
FIG. 17 shows frame formats indicating an example of places for inserting pilot signals.

FIG. 17 shows another example for inserting the first and the second pilot signals. In this example, the first pilot signals are inserted in all sub-carriers, and the data signals are divided into three groups each enclosed by a dotted line. The second pilot signal used for each group is inserted into each sub-carrier of low frequency. That is, one second pilot signal is shared in one group. The second pilot signal is inserted in a sub-carrier of the lowest frequency in each of the three groups, so that the cyclic shift amount that can be determined can be increased similarly in the three groups.

Figure 18:
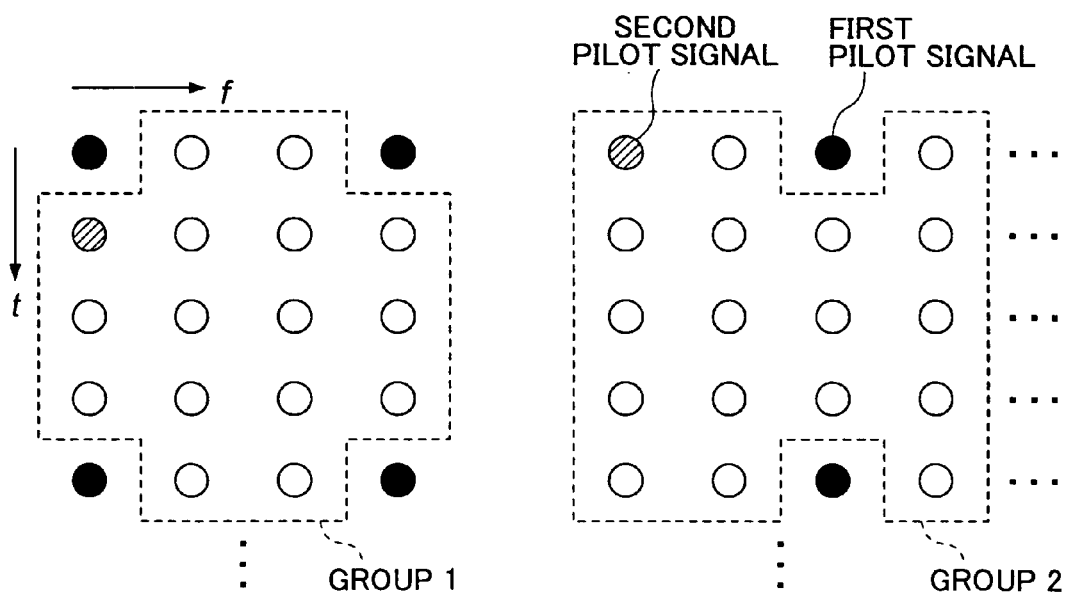
FIG. 18 shows frame formats indicating an example of places for inserting pilot signals.

FIG. 18 shows another example for inserting the first and the second pilot signals. In the examples shown in FIGS. 13, 15 and 16, pilot signals are inserted in each group so as to form the same placement pattern in each group. In contrast, in the example shown in FIG. 18, although pilot signals are inserted at predetermined intervals in the frequency direction, positions of the pilot signals are different between the group 1 and the group 2. Channel estimation values for every sub-carrier can be obtained by interpolation in the frequency direction and the cyclic shift amount can be obtained by comparing the first pilot signal with the second pilot signal. The interval for the first pilot signal can be determined based on the impulse response length in the channel between the transmission apparatus and the receiving apparatus. The frequency interval of the second pilot signal is preferably determined based on grouping of the sub-carriers.

The method for inserting the pilot signal is not limited to the above-mentioned examples. In the example in which the pilot signals are arranged in the frequency direction, by increasing the number of pilot signals that are arranged in the time direction, it becomes possible to accurately track channel variations in the time direction. In an environment in which the mobile terminal moves at high speed, it is desirable to check channel variations in the time direction.

Although an example adopting the cyclic shift method is described in this embodiment, the PTS method can be also used. When using the PTS method, since the phase rotation amount $\theta_{n1}$ for an $n_1$-th sub-carrier is the same as the phase rotation amount $\theta_{n2}$ for an $n_2$-th sub-carrier, it is not necessary to calculate the phase rotation amount by using the above equation.

Third Embodiment

Figure 19:
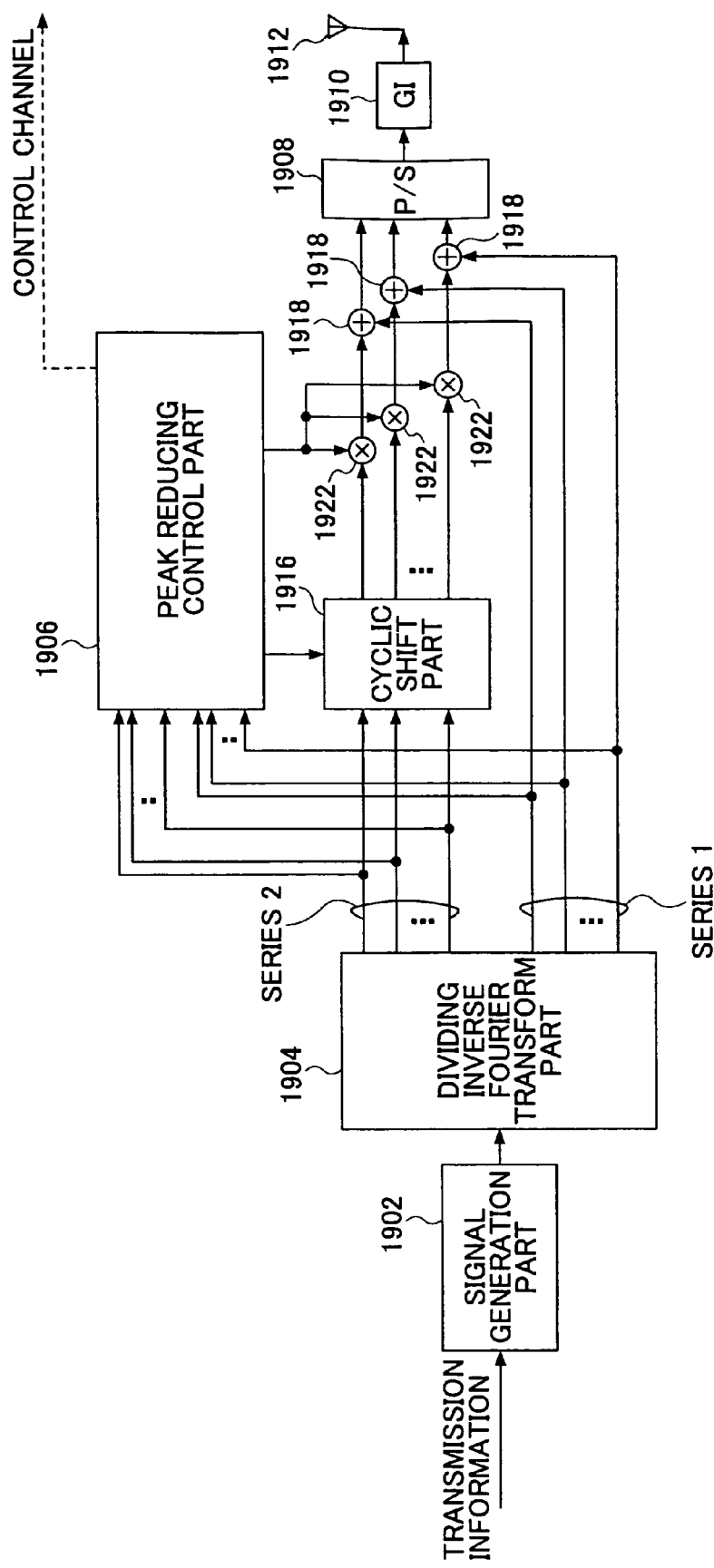
FIG. 19 is a partial block diagram of a transmission apparatus according to an embodiment of the present invention.

FIG. 19 is a partial block diagram of a transmission apparatus according to an embodiment of the present invention. The transmission apparatus includes a signal generation part 1902, a dividing inverse Fourier transform part 1904, a peak reducing control part 1906, a cyclic shift part 1916, plural multiplying parts 1922, plural synthesizing parts 1918, a parallel-serial transform part (P/S) 1908, a guard interval adding part 1910 and an antenna 1912.

The signal generation part 1902 receives transmission information, and forms signal information corresponding to each sub-carrier so as to output a signal series.

The dividing inverse Fourier transform part 1904 is almost similar to one described with reference to FIG. 8. The dividing inverse Fourier transform part 1904 receives a signal, and outputs a signal series 1 and a signal series 2 as two signal groups on which inverse Fourier transform has been performed.

The peak reducing control part 1906 outputs cyclic shift information $N_{shift}$ indicating a proper shift amount for the signal series. In addition, the cyclic shift information $N_{shift}$ can be known in the receiving side via the control channel and pilot signals. Weights to be supplied to the multiplying parts 1922 by the peak reducing control part 1906 are weights for reducing peak amplitude when amplitude and/or phase of the signal series 1 and amplitude and/or phase of the signal series 2 that has been rearranged are synthesized. Information on the weight can be also known in the receiving side via the control channel and the pilot signals and the like.

The cyclic shift part 1916 performs cyclic shifts on the signal series 2 such that the arranging order of the signals becomes the order indicated by the cyclic shift information $N_{shift}$.

The multiplying parts 1922 apply weights to each signal based on the control signal from a weight control part 1920 (not shown in the figure) in the peak reducing control part 1906.

The synthesizing part 1918 synthesizes (adds) the cyclic-shifted and weight-applied series 2 and the signal series 1.

The parallel-serial conversion part (P/S) 1908 converts plural parallel signals to a serial signal series.

The guard interval adding part (GI) 1910 adds a guard interval to a signal series so as to generate the OFDM signal to be transmitted from the antenna 1912.

In the embodiment shown in the figure, in addition to rearranging the signals by the cyclic shift part 1916, amplitude and/or phase of each signal to be transmitted can be controlled. A proper weight and a proper cyclic shift amount are supplied to each signal such that the peak power value after synthesizing becomes a proper size. Therefore, PAPR of signals output from the synthesizing parts 1918 is properly reduced. Then, the signals are converted to a serial signal, the guard interval is added to the signal so that the signal is transmitted from the antenna. According to the present embodiment, since more candidate transmission signals can be generated compared with the first embodiment, PAPR can be further reduced. According to the present embodiment, the peak can be properly reduced irrespective of the size of the amplitude of the signal before synthesizing.

According to the present embodiment, by using one of or both of the cyclic shift method and the weight control method, PAPR can be reduced. When using both of the methods, in addition to using the second pilot signal that is multiplexed with the signal that is input to the cyclic shift part, a third pilot signal to which a weight relating to the weight control is applied can be used. Of course, the first pilot signal is transmitted without cyclic shift and weighting. A frame format similar to those shown in FIGS. 16-18 can be used as a frame format in this case.

Fourth Embodiment

Figure 20:
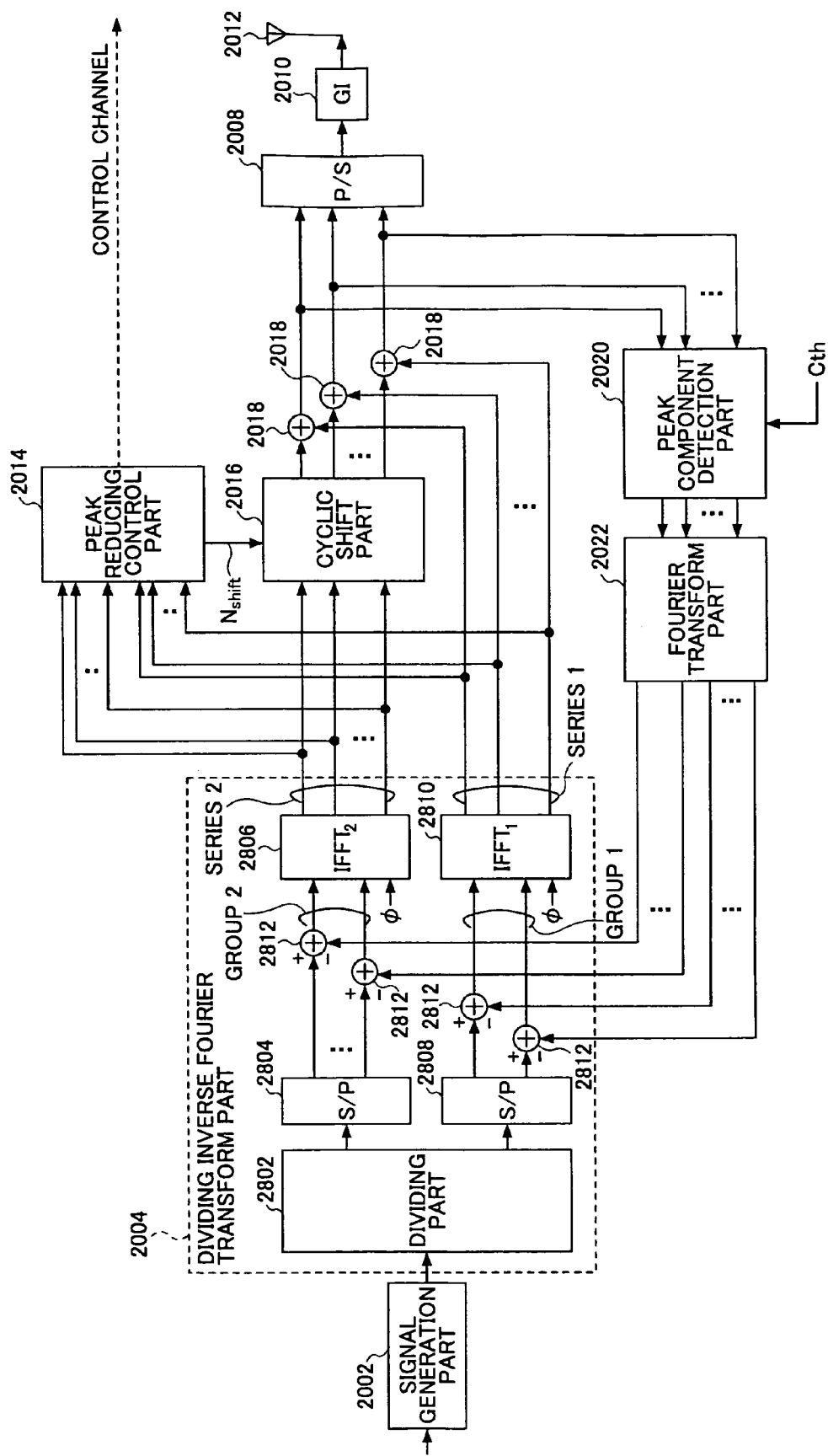
FIG. 20 is a partial block diagram of the transmission apparatus according to an embodiment of the present invention.

FIG. 20 is a partial block diagram of the transmission apparatus according to an embodiment of the present invention. The transmission apparatus includes a signal generation part 2002, a dividing inverse Fourier transform part 2004, a peak reducing control part 2014, a cyclic shift part 2016, plural synthesizing parts 2018, a parallel-serial conversion part (P/S) 2008, a first serial-parallel transform part 2804, a second inverse transform part 2806, a second serial-parallel transform part 2808, a first inverse Fourier transform part 2810, and plural synthesizing parts 2812. In addition, the transmission apparatus includes a feedback route between an output of the synthesizing part 2018 and an input of the synthesizing part 2812, in which a peak component detection part 2020 and a Fourier transform part 2022 are provided. Components the same as those described in the first embodiment have the same configuration and perform the same operation as the first embodiment. In this embodiment, the feedback route is added in addition to the configuration of the first embodiment.

The peak component detection par 2020 detects a signal output from the synthesizing part 2018 that exceeds a predetermined threshold Cth so as to subtract the threshold from the signal and output the subtracted signal. When the signal from the synthesizing part 2018 does not exceed the predetermined threshold, 0 is output from the peak component detection part 2020.

The Fourier transform part 2022 performs fast Fourier transform on outputs from the peak component detection part 2020 to output feedback signals.

The synthesizing part 2812 in the dividing inverse Fourier transform part 2004 subtracts the feedback signal on which Fourier transform has been performed from a signal to be transmitted, and supplies the result to the inverse Fourier transform part (2806 or 2810).

The feedback signal represents a signal component that exceeds the predetermined threshold Cthin a signal component output from the synthesizing part 2018. The signal component is subtracted from the transmission signal, and inverse Fourier transform is performed on the signal from which the feed back signal component has been subtracted so that a signal in which PAPR is reduced can be obtained. In addition to performing cyclic shifts by the cyclic shift part 2016, by recursively reducing the voltage by using the feedback route, PAPR can be further reduced.

Fifth Embodiment

FIG. 22 is a partial block diagram of a transmission apparatus according to an embodiment of the present invention. The transmission apparatus includes a signal generation part 2202, a dividing inverse Fourier transform part 2204, a peak reducing control part 2205, a peak reducing process part 2206, a parallel-serial transform part (P/S) 2208, a guard interval adding part 2210 and an antenna 2212. The peak reducing control part 2205 includes a peak detection part 2214 for the series 1, a peak detection part 2216 for the series 2, and a peak reducing control amount determination part 2218.

The signal generation part 2202 receives transmission information, and forms signal information corresponding to each sub-carrier so as to output a signal.

The dividing inverse Fourier transform part 2204 is similar to one described with reference to FIG. 8. The dividing inverse Fourier transform part 2204 receives a signal, and outputs a signal series 1 and a signal series 2 as two signal groups on which inverse Fourier transform has been performed.

The peak reducing control part 2205 detects a peak position for each of the series 1 and the series 2, so as to output a peak control signal such that the OFDM signal in which PAPR is reduced is generated.

The peak detection part 2214 monitors amplitude of the signal of the series 1 so as to detect an amplitude value that exceeds a predetermined value, and outputs the amplitude value and the timing $t_p$ of the amplitude as a peak position. The peak detection part 2216 monitors amplitude of the signal of the signal series 2 so as to detect an amplitude value that exceeds a predetermined value, and outputs the amplitude value and the timing $t_p'$ as a peak position.

The peak reducing control amount determination part 2218 outputs a peak control signal based on the outputs from the peak detection part 2214 and 2216 such that the OFDM signal in which PAPR is reduced can be generated. The peak control signal may be a signal indicating the before-mentioned cyclic shift amount or may be a signal indicating the phase rotation amount (that is the weight). That is, in this embodiment, PAPR of the OFDM signal can be reduced by both of or one of the peak reducing method by the cyclic shift and the peak reducing method by the weight control (improved method of the conventional PTS method).

The peak reducing process part 2206 adjusts signals output from the dividing inverse Fourier transform part 2204 based on the peak control signal from the peak reducing control part 2205. When the cyclic method is adopted, the synthesizing order between the signal series 1 and the signal series 2 is properly adjusted. When the weight control method is adopted, weights including the phase rotation amounts for the signal series 1 and the signal series 2 are properly adjusted according to the peak control signal.

The parallel-serial conversion part (P/S) 2208 converts plural parallel signals to a serial signal series.

In this embodiment, the peak position is detected in the peak detection part 2214 or 2216 for each signal series (for each inverse Fourier transform part in the dividing inverse Fourier transform part 2204). The peak position is specified by the amplitude value and the timing. The number of the peak positions that are detected is not limited to one, and first to n-th largest peak positions may be detected. For the sake of simplicity, the operation is described in a case where n=1 and the cyclic shift method is adopted. The same operation is applied similarly to a case where n>1. Assuming that the signal in the signal series 1 is $S_1(t)$, the signal in the signal series 2 is $S_2(t)$, and that $S_1(t)$ includes an amplitude value (peak) greater than that of $S_2(t)$. The peak reducing control amount determination part 2218 determines such size order of the peak values so as to determine the cyclic shift amount t' according to the following equation:

$$t' = \text{Arg min}[|S_1(t_p) + S_2(t_p + t'')|]$$

wherein t" indicates a time parameter for cyclically shifting the signals, Arg min indicates a function for returning a time parameter (shift amount) when the argument is a minimum value, and $t_p$ indicates a time parameter when $S_1(t)$ is a maximum value.

When the weight control method is adopted, the peak reducing control amount determination part 2218 determines the weight to be supplied to each signal by obtaining the phase rotation amount θ satisfying the following equation:

$$\arg[S_1(t_p)] + \pi = \arg[S_2(t_p)] + \theta$$

wherein arg indicates a phase angle of the argument. As shown in the equation, the phase rotation amount θ is determined such that the peak position of the signal series 1 and the peak position of the signal series 2 are synthesized in which the phases are inverted with each other, in other words, such that the peak position of the signal series 1 and the peak position of the signal series 2 are weakened with each other. The peak reducing control amount determination part 2218 determines such phase relation, and obtains the phase rotation amount θ such that the peaks are synthesized with inverted phases with each other so as to generate the peak control signal.

When the phase rotation amount that can be set by the peak reducing process part 2206 is limited to predetermined values, a value close to the phase rotation amount obtained in the above-mentioned way is selected from the predetermined values.

When both of the cyclic shift method and the weight control method are used, cyclic shift of $(t_p - t_p')$ is performed on the signal series 2 first, wherein $t_p$ indicates the peak position for the signal $S_1(t)$ of the signal series 1, and $t_p'$ indicates the peak position for the signal $S_2(t)$ of the signal series 2. Next, phase rotation by $\arg[S_1(t_p)] + \pi - \arg[S_2(t_p')]$ is performed on the signal $S_2(t)$ of the signal series 2. That is, peak positions are aligned between the signal series 1 and the signal series 2 by the cyclic shift method, and the phase is rotated such that the signal series 1 and 2 are synthesized with inverted phases by the weight control method.

After that, according to the peak control signal, cyclic shift or phase rotation is performed on the signals output from the dividing inverse Fourier transform part, the signals are converted to a serial signal, and the guard interval is added to the signal, so that the OFDM signal in which PARP is reduced is generated finally.

According to the present embodiment, the peaks are detected from the signals before synthesizing, and, synthesized outputs, corresponding to only the peak signals, are generated in which all possible cyclic shift amounts and weight candidates are applied. A cyclic shift amount and weight are determined, as a final control amount (peak control signal), such that the peak of the synthesized output is the minimum. Therefore, an optimal transmission signal can be determined easier than the conventional method in which transmission signals are generated for every possible weight candidate corresponding to an information bit series so as to select an optimum transmission signal.

Sixth Embodiment

In the above-mentioned embodiments, the dividing inverse Fourier transform part includes two transform parts so that two series are output. In the following examples, methods for dealing with more series are described.

In a method of the present invention, when there are three series, namely signal series 1, 2, and 3, (in other words, the dividing part 802 in FIG. 8 divides the signal into three), the optimum shift amount or weight is determined between two series first as described in the above-mentioned embodiments. Then, a synthesized series is obtained by synthesizing the series 1 and the series 2 that has been adjusted according to the shift amount or the weight. The same process is repeated between the synthesized series and the series 3, so that an optimum shift amount or weight is determined on the series 3. When there are more numbers of series, the shift amount can be obtained in the same way. According to this method, as shown in FIG. 21, the optimum shift amount can be obtained by performing determination of the shift amount (N−1) times for the N series. Since the shift amount or the weight is obtained for each series, by providing at least one peak reducing process part for two series at the minimum, the shift amount or the weight can be properly determined for many series.

Figure 9:
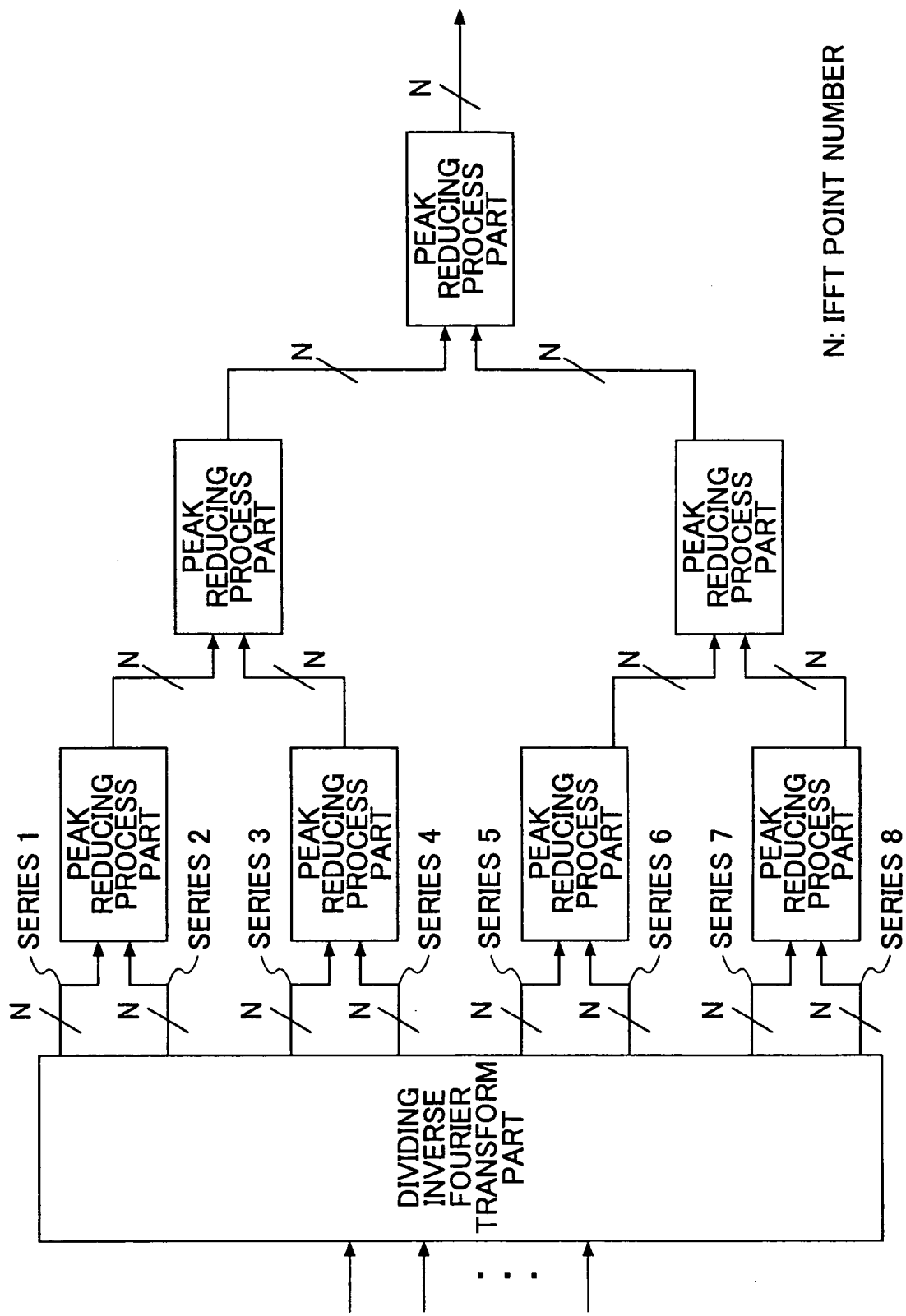
FIG. 9 is a block diagram of a modified example of a peak reducing process part.
Figure 10:
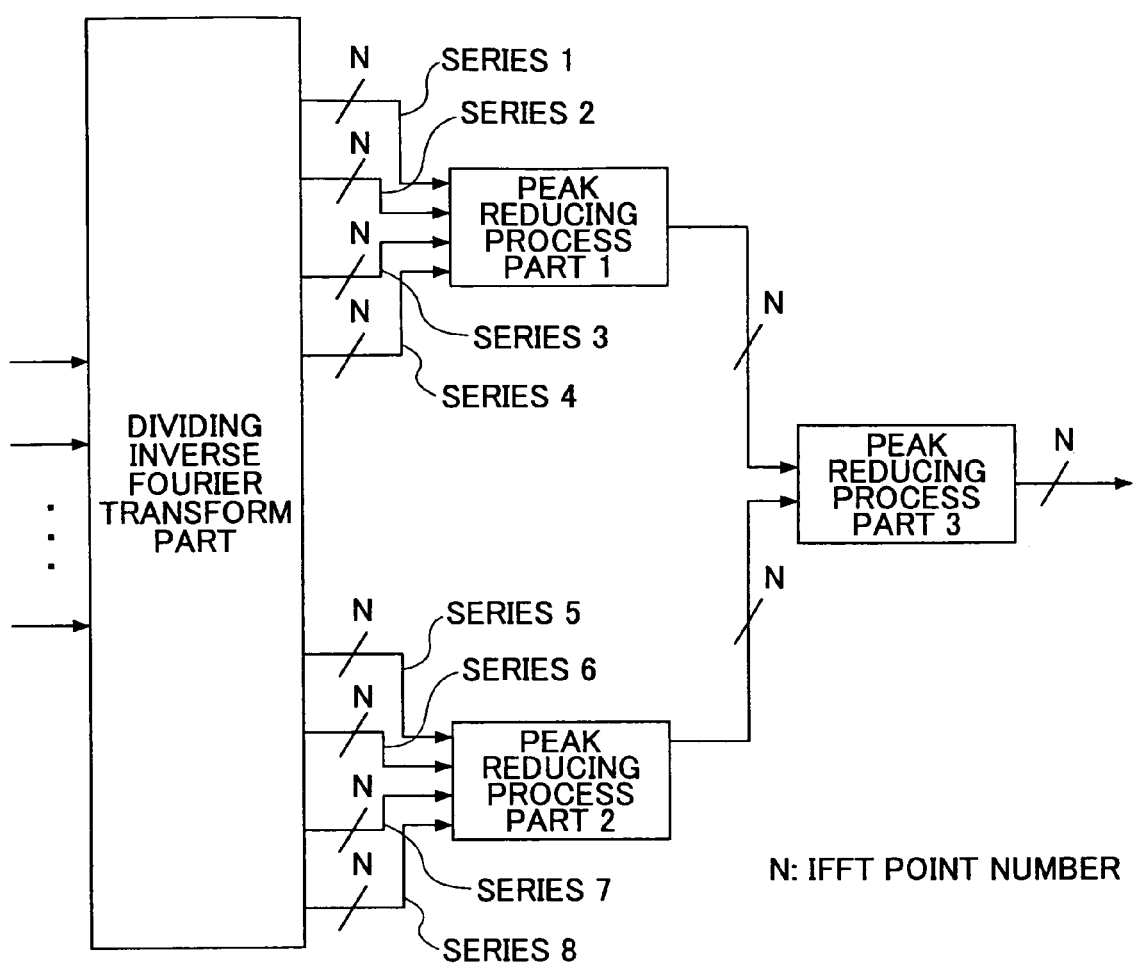
FIG. 10 is a block diagram of another modified example of a peak reducing process part.

In other method of the present invention, tree-structured plural peak reducing control parts are used, so that the shift amount or the weight can be obtained for many series (FIG. 9). Accordingly, the transmission signal can be determined quickly. The configuration of the plural peak reducing process parts is not limited to that shown in FIG. 9. Various configurations can be adopted according to the performance (number of series that can be processed once, and the like) of the peak reducing process part. For example, as shown in FIG. 10, a peak reducing process part that can obtain the shift amount and the weight for many series at one time can be used. In the example shown in the figure, each of the peak reducing process parts 1 and 2 obtains the optimum shift amount for four series at the same time. Accordingly, compared with the case shown in FIG. 9, the number of the peak reducing process parts can be reduced. Accordingly, design flexibility for placement and configuration of the peak reducing process part can be increased.

The present invention is not limited to the specifically disclosed embodiments, and variations and modifications may be made without departing from the scope of the invention.

The present application contains subject matter related to Japanese Patent Application No. 2004-155033, filed in the JPO on May 25, 2004, the entire contents of which are incorporated herein by reference.

What is claimed is:

1. A transmission apparatus used in a radio communication system adopting the OFDM scheme, the transmission apparatus comprising:

a dividing inverse Fourier transform part including plural transform parts, wherein the dividing inverse Fourier transform part divides a signal to be transmitted into plural signal groups, and each of the plural transform parts performs inverse Fourier transform on one of the plural signal groups;

a peak control part configured to output a peak control signal that is obtained using a peak position that is detected for each output signal group output from the dividing inverse Fourier transform part; and a peak reducing process part configured to apply a weight to an output signal group output from at least one of the plural transform parts or to cyclically shift an order of the output signal group according to the peak control signal so as to output an adjusted signal group, the peak reducing process part being further configured to add the adjusted signal group to another signal group output from a transform part other than the at least one of the plural transform parts so as to output an added signal group, wherein the peak control part generates, as the peak control signal, the weight to be applied to the output signal group or a shift amount used for cyclically shifting the order using the peak position.

2. The transmission apparatus as claimed in claim 1, the peak control part comprising a peak detection part configured to detect a predetermined number of peak positions for each of the output signal groups output from the dividing inverse Fourier transform part, wherein the peak control part obtains the peak control signal using the predetermined number of peak positions.

3. The transmission apparatus as claimed in claim 1, the peak reducing process part comprising:
a cyclic shift part configured to shift the arranging order of the output signal group output from at least one of the plural transform parts; and
an adding part configured to add an output from the cyclic shift part with an output from a transform part other than the at least one of the plural transform parts.

4. The transmission apparatus as claimed in claim 2, the peak reducing process part comprising:
a weight adjusting part configured to adjust an amplitude and/or a phase of the output signal group output from at least one of the plural transform parts according to the peak control signal; and
adding part configured to add an output from the weight adjusting part with an output from a transform part other than the at least one of the plural transform parts.

5. The transmission apparatus according to claim 1,
wherein the dividing inverse Fourier transform part includes at least first, second and third transform parts each performing inverse Fourier transform,
the peak reducing process part adjusts a weight or an arranging order of the output signal group output from the first transform part according to the peak control signal to output a first adjusted signal,
an adding part adds the first adjusted signal group with a signal group output from the second transform part to output an added signal group, and
the peak reducing process part adjusts a weight or an arranging order of the added signal group according to the peak control signal to output a second adjusted signal group, and
the adding part adds the second adjusted signal group with a signal group output from the third transform part.

6. The transmission apparatus according to claim 1, further comprising:
a second peak reducing process part configured to add a signal group output from the peak reducing process part to another signal group according to the peak control signal so as to output added signal group.

7. The transmission apparatus as claimed in claim 6, wherein the another signal group added to the signal group output from the peak reducing process part is a signal group output from a third peak reducing process part.

8. The transmission apparatus according to claim 3, wherein a feedback route is provided between the adding part and the dividing inverse Fourier transform part to subtract a signal component output from the adding part from the signal to be transmitted, the signal component output from the adding part exceeding a predetermined threshold.

9. A transmission apparatus used in a radio communication system adopting the OFDM scheme, the transmission apparatus comprising:
a dividing inverse Fourier transform part including plural transform parts, wherein the dividing inverse Fourier transform part divides a signal to be transmitted into plural signals, and each of the plural transform parts performs inverse Fourier transform on one of the plural signals;
a peak control part for outputting a peak control signal based on peaks that are detected from output signals of the dividing inverse Fourier transform part; and
a peak reducing process part for adjusting a weight or an arranging order of an output signal of the dividing inverse Fourier transform part according to the peak control signal to output an adjusted signal, and synthesizing the adjusted signal with other signal so as to output a synthesized signal,
wherein plural frequency groups each including plural subcarriers are provided, and the peak reducing process part adjusts a phase and/or arranging order of the output signal for each frequency group, and
a second pilot signal is multiplexed with an input signal of the peak reducing process part, and a first pilot signal is multiplexed to an output signal of the peak reducing process part, so that the second pilot signal and the first pilot signal are transmitted.

10. The transmission apparatus as claimed in claim 9, wherein the second pilot signal is inserted in a part of subcarriers.

11. A receiving apparatus in a radio communication system adopting the OFDM scheme, the radio communication system including a transmission apparatus and the receiving apparatus, the transmission apparatus comprising:
a dividing inverse Fourier transform part including plural transform parts, wherein the dividing inverse Fourier transform part divides a signal to be transmitted into plural signals, and each of the plural transform parts performs inverse Fourier transform on one of the plural signals;
a peak control part for outputting a peak control signal based on peaks that are detected from output signals of the dividing inverse Fourier transform part; and
a peak reducing process part for adjusting a weight or an arranging order of an output signal of the dividing inverse Fourier transform part according to the peak control signal to output an adjusted signal, and synthesizing the adjusted signal with another signal so as to output a synthesized signal,
wherein plural frequency groups each including plural subcarriers are provided, and the peak reducing process part adjusts a phase and/or arranging order of the output signals for each frequency group, and
a second pilot signal is multiplexed with an input signal of the peak reducing process part, and a first pilot signal is multiplexed to an output signals of the peak reducing process part, so that the second pilot signal and the first pilot signal are transmitted,
the receiving apparatus comprising:
an adjusting part for adjusting a received signal according to information of the peak control signal, wherein the receiving apparatus averages plural channel estimation values calculated from plural first pilot signals inserted in the same frequency group so as to correct a channel estimation value.

* * * * *